United States Patent
Zagal Chavez et al.

(10) Patent No.: US 12,116,501 B2
(45) Date of Patent: Oct. 15, 2024

(54) CONFIGURABLE COATING SYSTEM

(71) Applicant: Consorcio Comex S.A. de C.V., Mexico City (MX)

(72) Inventors: Alejandro Zagal Chavez, Mexico City (MX); Alejandro Morones Dobarganes, Mexico City (MX)

(73) Assignee: Consorcio Comex S.A. DE C.V., Mexico City (MX)

( * ) Notice: Subject to any disclaimer, the term of this patent is extended or adjusted under 35 U.S.C. 154(b) by 316 days.

(21) Appl. No.: 17/272,173

(22) PCT Filed: Aug. 28, 2019

(86) PCT No.: PCT/IB2019/057227
§ 371 (c)(1),
(2) Date: Feb. 26, 2021

(87) PCT Pub. No.: WO2020/044247
PCT Pub. Date: Mar. 5, 2020

(65) Prior Publication Data
US 2022/0119647 A1 Apr. 21, 2022

Related U.S. Application Data

(60) Provisional application No. 62/723,520, filed on Aug. 28, 2018.

(51) Int. Cl.
*C09D 5/02* (2006.01)
*C09D 17/00* (2006.01)
*C09D 125/14* (2006.01)
*C09D 133/06* (2006.01)

(52) U.S. Cl.
CPC ........... *C09D 5/022* (2013.01); *C09D 17/001* (2013.01); *C09D 17/008* (2013.01); *C09D 125/14* (2013.01); *C09D 133/062* (2013.01)

(58) Field of Classification Search
CPC .. C09D 5/022; C09D 17/008; C09D 133/062; C09D 125/14; C09D 17/001
USPC ........................................................ 524/431
See application file for complete search history.

(56) References Cited

U.S. PATENT DOCUMENTS

| | | | |
|---|---|---|---|
| 5,785,749 A * | 7/1998 | Knesek | C09C 1/42 241/26 |
| 6,221,145 B1 | 4/2001 | McClain | |
| 6,531,537 B2 | 3/2003 | Friel et al. | |
| 7,132,142 B2 | 11/2006 | Truog et al. | |
| 7,919,546 B2 | 4/2011 | Trevino, III et al. | |
| 2004/0059041 A1 | 3/2004 | McClain et al. | |
| 2007/0181598 A1 | 8/2007 | Cremeans | |
| 2008/0242799 A1 | 10/2008 | Bizzio | |
| 2008/0254284 A1 * | 10/2008 | Tersteeg | C08G 18/8064 204/192.15 |
| 2011/0245369 A1 | 10/2011 | Lundgard et al. | |
| 2017/0088723 A1 | 3/2017 | Sheerin et al. | |
| 2017/0240753 A1 | 8/2017 | Rossetti et al. | |
| 2019/0367763 A1 * | 12/2019 | Rossetti | C09D 7/43 |

FOREIGN PATENT DOCUMENTS

| | | |
|---|---|---|
| CN | 101952225 A | 1/2011 |
| CN | 104559502 A | 4/2015 |
| CN | 107001814 A | 8/2017 |
| CN | 108291100 A | 7/2018 |
| EP | 1526150 A1 | 4/2005 |
| WO | 2012/113915 A1 | 8/2012 |
| WO | 2016059584 A1 | 4/2016 |
| WO | 2018134749 A1 | 7/2018 |

OTHER PUBLICATIONS

Duncan J. L. et al., Water-dispersible polyurethane coatings for the Department of Defense:, Metal Finishing: Devoted Exclusively To Metall Surface Treatments, Elsevier, New York, NY, US, vol. 99, No. 7, Jul. 1, 2001, pp. 31, 33-34.

* cited by examiner

*Primary Examiner* — Hui H Chin
(74) *Attorney, Agent, or Firm* — Diane R. Meyers

(57) ABSTRACT

A coating system includes, as separate components: (a) a hiding pigment-free basecoat composition, including: (i) a basecoat resin; and (ii) a liquid carrier; and (b) and/or (c) as follows: (b) a pigment slurry composition, including: (iii) a hiding pigment; (iv) a rheology modifier; and (v) a liquid carrier; (c) an extender pigment slurry composition, including: (vi) an extender pigment; (vii) a rheology modifier; and (viii) a liquid carrier. The rheology modifier (iv) and/or (vii) includes an organic rheology modifier and an inorganic rheology modifier. The separate components are not mixed together. A method of preparing a coating composition is also disclosed.

18 Claims, 2 Drawing Sheets

CONFIGURABLE COATING SYSTEM

FIELD OF THE INVENTION

The present invention relates to a coating system and a method of preparing a coating composition.

BACKGROUND OF THE INVENTION

Coatings are used to protect and beautify a substrate over which they are applied. Architectural coatings, in particular, can be obtained in a variety of colors and sheens (e.g. flat/matte, velvet-like, eggshell, semi-gloss, gloss, high-gloss, or satin).

Typically, architectural coatings are tinted to obtain a desired color. In coating stores, a base system is used, and stores usually have three to five base systems for each sheen. Each sheen usually has different base systems called white, medium bases, and deep bases. The white may be used as-is for a white paint or tinted to produce a very light pastel colors. The medium bases contain less titanium dioxide and require tinting; they are designed for deeper colors and mid-tones. The deep bases contain little or no titanium dioxide and are designed for deep fully pigmented colors.

Therefore, coatings stores maintain around three to five bases per finish, i.e. five bases for flat finish, five bases for matte finish, etc., which means around 25 to 35 bases per each coating line (e.g. premium, high, medium, or economy). A simplified way of obtaining a coating composition having the desired color and sheen would be desirable.

SUMMARY OF THE INVENTION

The present invention is directed to a coating system, including as separate components: (a) a hiding pigment-free basecoat composition, including: (i) a basecoat resin; and (ii) a liquid carrier; and (b) and/or (c) as follows: (b) a pigment slurry composition, including: (iii) a hiding pigment; (iv) a rheology modifier; and (v) a liquid carrier; (c) an extender pigment slurry composition, including: (vi) an extender pigment, (vii) a rheology modifier; and (viii) a liquid carrier. The rheology modifier (iv) and/or (vii) includes an organic rheology modifier and an inorganic rheology modifier. The separate components are not mixed together.

The present invention is also directed to a coating system, including as separate components: (a) a hiding pigment-free basecoat composition, including: (i) a basecoat resin: and (ii) a liquid carrier; and at least two of (b)-(d): (b) a resin-free pigment slurry composition, including: (iii) a hiding pigment; and (iv) a liquid carrier; and (c) a resin-free extender pigment slurry composition, including: (v) an extender pigment; and (vi) a liquid carrier; and (d) a resin slurry composition, comprising: (vii) a resin; and (viii) a liquid carrier. The separate components are not mixed together.

The present invention is also directed to a method of preparing a coating composition, including mixing the following separate components from Option 1 or Option 2 together in a container to form the coating composition: Option 1: (a) a hiding pigment-free basecoat composition, including: (i) a basecoat resin; and (ii) a liquid carrier; and (b) and/or (c) as follows: (b) a pigment slurry composition, including: (iii) a hiding pigment; (iv) a rheology modifier; and (v) a liquid carrier; (c) an extender pigment slurry composition, including: (vi) an extender pigment; (vii) a rheology modifier; and (viii) a liquid carrier, where the rheology modifier (iv) and/or (vii) includes an organic rheology modifier and an inorganic rheology modifier; Option 2: (a) a hiding pigment-free basecoat composition, including: (i) a basecoat resin; and (ii) a liquid carrier; and at least two of (b)-(d): (b) a resin-free pigment slurry composition, including: (iii) a hiding pigment; and (iv) a liquid carrier; and (c) a resin-free extender pigment slurry composition, including: (v) an extender pigment; and (vi) a liquid carrier; and (d) a resin slurry composition, comprising: (vii) a resin; and (viii) a liquid carrier. The separate components are not mixed together until added to the container.

DESCRIPTION OF THE INVENTION

Figure 1A:
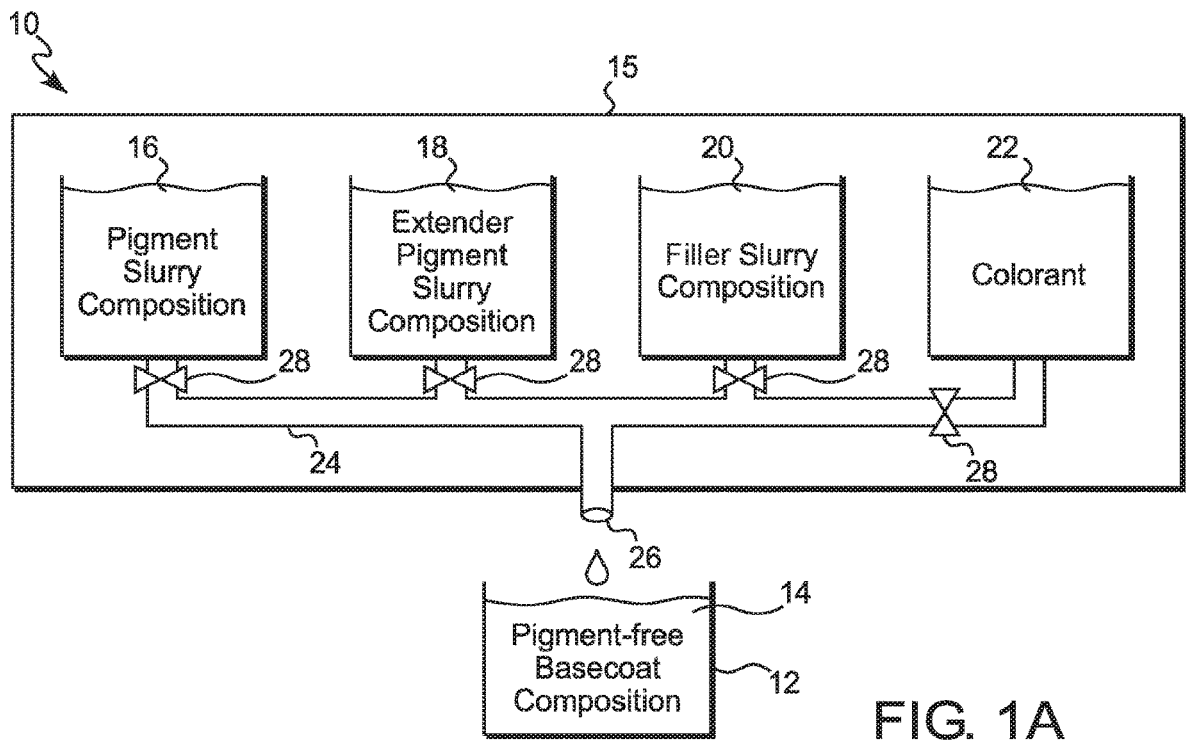
FIG. 1A shows a tinting system according to the present invention.

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise.

As used herein, the transitional term "comprising" (and other comparable terms, e.g., "containing" and "including") is "open-ended" and open to the inclusion of unspecified matter. Although described in terms of "comprising", the terms "consisting essentially of" and "consisting of" are also within the scope of the invention.

As used herein, the term "polymer" is meant to refer to prepolymers, oligomers, and both homopolymers and copolymers. The term "resin" is used interchangeably with "polymer".

As used herein, "free" means that a particular material is not purposefully added to a composition and only is present in a trace amount as an impurity.

As used herein, "slurry" refers to a mixture including at least one component dispersed in a liquid carrier. For example, a slurry may include a resin, pigment, extender, filler, or some combination thereof in a liquid carrier. The liquid carrier may be an aqueous medium or a solvent medium.

As used herein, an "aqueous medium" refers to a liquid medium comprising at least 50 weight % water, based on the total weight of the liquid medium. Such aqueous liquid mediums can comprise at least 60 weight % water, or at least 70 weight % water, or at least 80 weight % water, or at least 90 weight % water, or at least 95% water, based on the total weight of the liquid medium. The solvents that make up less than 50 weight % of the liquid medium may include organic solvents. Suitable organic solvents include polar organic solvents e.g. protic organic solvents such as glycols, glycol ether alcohols, alcohols, and volatile ketones, glycol diethers, esters, and diesters. Other organic solvents include aromatic and aliphatic hydrocarbons.

As used herein, a "solvent medium" refers to a liquid medium comprising at least 50 weight % solvent, based on the total weight of the liquid medium. Such solvent liquid mediums can comprise at least 60 weight % solvent, or at least 70 weight % solvent, or at least 80 weight % solvent, or at least 90 weight % solvent, or at least 95% solvent based on the total weight of the liquid medium. Water may make up less than 50 weight % of the liquid medium. Other solvents include polar organic solvents e.g. protic organic solvents such as glycols, glycol ether alcohols, alcohols, and volatile ketones, glycol diethers, esters, diesters, aromatic and aliphatic hydrocarbons.

Certain systems and chemistries for simplifying architectural coating composition systems from many bases to several bases have been taught in US 2017/0240753 and WO 2018/134749, for example. The present invention allows for even further control over the coating composition, such as over the color and sheen of the coating composition.

A coating composition may include a mixture of the following separate components: (a) a hiding pigment-free basecoat composition, comprising: (i) a basecoat resin; and (ii) a liquid carrier; and (b) and/or (c) as follows: (b) a pigment slurry composition, comprising: (iii) a hiding pigment; (iv) a rheology modifier; and (v) a liquid carrier; (c) an extender pigment slurry composition, comprising: (vi) an extender pigment; (vii) a rheology modifier; and (viii) a liquid carrier, wherein the rheology modifier (iv) and/or (vii) comprises an organic rheology modifier and an inorganic rheology modifier.

A coating composition may include a mixture of the following separate components: (a) a hiding pigment-free basecoat composition, comprising: (i) a basecoat resin; and (ii) a liquid carrier; (b) a resin-free pigment slurry composition, comprising: (iii) a hiding pigment; and (v) a liquid carrier; and (c) a resin-free extender pigment slurry composition, comprising: (vi) an extender pigment; and (viii) a liquid carrier.

The coating composition may further include (d) a resin slurry composition. The coating composition may further include (e) a colorant.

The coating composition may be a latex coating composition, an enamel coating composition, a varnish composition, and/or an ink composition. As used herein, "latex coating composition" means a coating composition having a dispersion of polymeric particles, the coating composition having no corrosion resistance, such as a water-borne or solvent-borne dispersion of polymeric particles; while an "enamel coating composition" means a coating composition having a dispersion of polymeric particles and being corrosion resistant, such as a water-borne or solvent-borne dispersion of polymeric particles. A coating composition having no corrosion resistance refers to a coating composition which fails the flash rust test according to ASTM D823 and ASTM D610 and the corrosion resistance test according to ASTM B117 and ASTM G85, while a coating composition having corrosion resistance refers to a coating composition which passes flash rust test and the corrosion resistance test. As used herein, "varnish composition" means a liquid composition which is converted to a transparent solid film after application as a thin layer. As used herein, "ink composition" means a liquid material suitable for writing or printing. The coating composition may be a solvent-borne coating composition including polymeric particles dispersed in a solvent medium. The coating composition may be a water-borne coating composition including polymeric particles dispersed in an aqueous medium.

The hiding pigment-free basecoat composition (a) may include: (i) a basecoat resin; and (ii) a liquid carrier. As used herein, "hiding pigment-free" means coating compositions that are free of hiding pigments. The basecoat resin (i) used in the hiding pigment-free basecoat composition (a) may be the same or different from the later-described resin (ix) used in the resin slurry composition (d). But when they are different, the resins may be compatible. As used herein, "compatible" means that the components can be added together without causing adverse effects to the performance or stability of the liquid coating composition and/or the cured coating. A coating composition including the compatible resins may be stable (as defined hereinafter) and have a change of less than or equal to 5 gloss units at 85° and a change in gloss unit of less or equal to 2 gloss units at 60° (compared to the same coating composition having only one of the compatible resins), gloss being measured according to ASTM D523.

The basecoat resin (i) may include a resin having acrylic, (meth)acrylic, vinyl, styrene, polyester, epoxy, urethane, or polysiloxane groups, or combinations thereof. Suitable resins for the basecoat resin (i) include acrylic resins; alkyd resins; styrene resins; styrene-acrylic resins; vinyl-acrylic resins; vinyl resins; vinyl-acetate (VEOVA™) resins; ethylene-vinyl acetate (EVA) resins; alkyd-acrylic resins; alkyd-styrene resins; vinyl toluene resins; alkyl substituted styrenes such as alpha-methyl styrene; vinyl acetate-ethylene; styrene-butadiene resins; vinyl toluene-butadiene resins; styrene-acrylonitrile resins; vinyl toluene-acrylonitrile resins; diisocyanate-polyol resins; vinyl alcohol resins; vinyl butyral resins; vinyl chloride resins; vinylidene chloride resins; or combinations thereof. The basecoat resin (i) may be present in an amount from 1 to 70%, such as from 1 to 60%, such as from 1 to 50%, such as from 1 to 40%, such as from 1 to 30%, such as 1 to 20%, such as 1 to 10%, by weight of the total components of the hiding pigment-free basecoat composition (a).

The liquid carrier (ii) in the hiding pigment-free basecoat composition (a) may be present in an amount from 1 to 80%, such as from 1 to 70%, such as from 1 to 60%, such as from 1 to 50%, such as 1 to 40%, such as 1 to 30%, by weight of the total components of the hiding pigment-free basecoat composition (a). The liquid carrier (ii) may be selected and be included in an amount such that the hiding pigment-free basecoat composition (a) is stable as a standalone (by itself and not combined with any other compositions) liquid composition. As used herein, "stable" means maintaining homogeneity without sediments in the bottom of the container holding the composition when stored without continuous vigorous agitation at 4° C.-60° C. for at least 1 year. The liquid carrier (ii) may be selected such that the coating composition containing the hiding pigment-free basecoat composition (a) is a stable composition.

Optionally, the hiding pigment-free basecoat composition (a) may comprise additives, and suitable additives can include a wide variety of materials known to one having ordinary skill in the art, such as UV light absorbers, hindered amine light stabilizers (HALS), surfactants, dispersants, rheology modifiers, defoamers, biocides, or some combination thereof.

Separate hiding pigment-free basecoat compositions (a) may be used based on the desired sheen (also referred to herein as "finish") of the coating composition. Separate hiding pigment-free basecoat compositions (a) may be used for flat/matte coatings, velvet-like coatings, eggshell coatings, semi-gloss coatings, gloss coatings, high-gloss coatings, satin coatings, and the like. Several hiding pigment-free basecoat compositions (a) corresponding to different sheens may be combined to form a sheen between the combined sheens (i.e., combinations of hiding pigment-free basecoat compositions (a) may be included). The hiding pigment-free basecoat composition (a) may be present in an amount from 40 to 95%, such as from 50 to 95%, such as 60 to 95%, such as 70 to 95%, such as 80 to 95%, such as 90 to 95% by volume of the total components of the coating composition.

The same hiding pigment-free basecoat composition (a) may be used regardless of the desired sheen of the coating composition (i.e., a single hiding pigment-free basecoat composition (a) may be used for any desired sheen). The hiding pigment-free basecoat composition (a) may be present in an amount from 40 to 95%, such as from 50 to 90%, such as 60 to 90%, such as 70 to 90%, such as 80 to 90%, by volume of the total components of the coating composition.

The pigment slurry composition (b) may include: (iii) a hiding pigment, (iv) optionally a rheology modifier, and (v) a liquid carrier. The pigment slurry composition (b) may be resin free. The pigment slurry composition (b) may be free of extender pigments. The pigment slurry composition (b) may include a stable slurry, i.e. a slurry that remains stable without continuous mixing. The pigment slurry composition (b) may include an unstable slurry, i.e. a slurry requiring intermittent or continuous mixing in order to avoid solids settling to the bottom of the container.

The hiding pigment (iii) may include titanium dioxide, and/or zinc oxide. The titanium dioxide may include anatase free chalking, rutile medium chalk resistant, rutile highly chalk resistant type, or combinations thereof. Other hiding pigments may be used. As used herein, a "hiding pigment" is a white pigment having a refractive index larger than 1.7. Refractive index, as used herein, may be measured using any suitable test method known to those having ordinary skill in the art, including pigment manufactures as commonly reported thereby on data sheets associated with commercially available pigments.

The hiding pigment (iii) may be present in an amount from 40 to 85%, such as from 50 to 85%, such as 60 to 85%, such as 70 to 85%, such as 80 to 85%, by weight of the total components of the pigment slurry composition (b).

The rheology modifier (iv) of the pigment slurry composition (b) may include an organic rheology modifier, an inorganic rheology modifier, or a derivative thereof, or a blend of at least two organic rheology modifiers; or a blend of at least two inorganic rheology modifiers; or a blend of an organic rheology modifier and an inorganic rheology modifier. As used herein, "rheology modifier" refers to a chemical component that substantially increases (e.g., thickener (compared to the same composition not including the rheology modifier)) or decreases (e.g., thinner (compared to the same composition not including the rheology modifier)) the viscosity of fluids at relatively low concentration (less than 5% of the coating composition) (Paint and Coating Testing Manual—Fifteenth Edition of the Gardner-Sward Handbook: (MNL 17-2nd)).

The rheology modifier (iv) may include a non-associative organic rheology modifier and/or an associative organic rheology modifier. When the rheology modifier (iv) includes a blend of at least two organic rheology modifiers, it may include a blend of at two non-associative organic rheology modifiers, or a blend of at two associative organic rheology modifiers, or a blend of a non-associative organic rheology modifier and an associative organic rheology modifier.

Suitable non-associative rheology modifiers include cellulosic rheology modifiers such as hydroxyalkyl celluloses including hydroxymethyl cellulose (HMC), hydroxyethyl cellulose (HEC), hydroxybutyl methyl cellulose (HBMC), ethylhydroxyethyl cellulose (EHEC), ethylmethylhydroxyethyl cellulose (EMHEC), hydroxypropyl cellulose (HPC), hydroxyethylpropyl cellulose (HEPC), hydroxyethylmethyl cellulose (HEMC), hydroxypropylmethyl cellulose (HPMC), carboxymethyl cellulose (CMC), sodium carboxymethyl cellulose (SCMC), or microcrystalline cellulose (MCC); galactomannan polysaccharide rheology modifiers such as guar gum (GG), hydroxypropyl guar gum (HPG), hydroxyethyl guar gum (HEG), or locust bean gum (LBG); fermentation biopolymer polysaccharide rheology modifiers such as xanthan gum (XCPS), welan, gellan, or diutin gums; alkali-swellable/soluble emulsions (ASE) rheology modifiers such as EA/MMA copolymers; nonionic synthetics rheology modifiers such as polyvinyl pyrolidone (PVP), polyvinyl alcohol (PVOH), or polyacrylamide (PAM); and the like.

Suitable associative rheology modifiers include hydrophobically modified cellulosics such as hydrophobically modified HEC (HMHEC), or hydrophobically modified EHEC (HMEHEC); galactomannan polysaccharide rheology modifiers such as hydrophobically modified HPG (HMHPG); alkali-swellable/soluble emulsions (ASE) rheology modifiers such as hydrophobically modified ASE (HASE) (an alkali-swellable/soluble emulsions having a hydrophobic component), or hydrophobically modified urethane ASE (HEURASE); hydrophobically modified nonionic synthetics (HMNS) rheology modifiers such as hydrophobically modified ethoxylate urethane (HEUR) (an ethoxylate urethane having a hydrophobic component), hydrophobically modified ethoxylate urea urethane (HEUUR), hydrophobically modified ethoxylate aminoplast (HEAT), hydrophobically modified ethoxylate ether (HEET), hydrophobically modified poly ether (HMPE), hydrophobically modified polyacetal polyether (HPAPE), hydrophobically modified polyacrylamide (HMPAM); and the like.

The rheology modifier (iv) may include modified inorganic rheology modifiers or unmodified inorganic rheology modifiers. An inorganic rheology modifier may be modified with an organic component or an additional inorganic component to form the modified inorganic rheology modifier, which may impart a desired property, such as to make the modified rheology modifier dispersible in liquid (e.g., water) or to modify the rheology thereof compared to the unmodified rheology modifier. When the a rheology modifier (iv) includes a blend of at least two inorganic rheology modifiers, it may include a blend of at least two modified inorganic rheology modifiers, or a blend of at two unmodified inorganic rheology modifiers, or a blend of a modified inorganic rheology modifier and an unmodified inorganic rheology modifier.

Suitable inorganic rheology modifiers may include clays, organoclays, or treated or untreated silicas, smectite clays such as bentonite (montmorillonite), sodium bentonite, calcium bentonite or hectorite; organoclays such as modified bentonite and hectorite or mixed mineral thixotropes (MMT), other clays like attapulgite (palygorskite), or sepiolite (meerschaumc); synthetic silicas such as precipitated silica or fumed silica (pyrogentic silica); hydrophobic silicas such as organo modified silica; titanate chelating agents, and the like.

When the rheology modifier (iv) includes a blend of an organic rheology modifier and an inorganic rheology modifier, it may include a blend of a modified inorganic rheology modifier and a non-associative organic rheology modifier; or a blend of a modified inorganic rheology modifier and an associative organic rheology modifier; or a blend of an unmodified inorganic rheology modifier and a non-associative organic rheology modifier; or a blend of an unmodified inorganic rheology modifier and an associative organic rheology modifier.

When the rheology modifier (iv) includes a blend of at least two rheology modifiers including an organic rheology modifier and an inorganic rheology modifier, the organic and the inorganic rheology modifier may be blended in a ratio of from 0.1:1 to 30:1, such that they are capable of thickening or modifying the rheology of the slurries.

The pigment slurry composition (b) may include high solids slurries where the solid volume is up to 90% with respect to the total components of the pigment slurry composition (b).

The rheology modifier (iv) may be present in an amount such that the settling rate is decreased (compared to the same coating composition not including the rheology modifier (iv)), but viscosity is not increased such that the coating composition is not pumpable. As used herein, the term "pumpable" refers to a liquid having a viscosity of below 50,000 cP at ambient temperature (20° C.-27° C.), the viscosity measured according to ASTM D2196. The amount of rheology modifier used can vary depending on the rheology modifier or rheology modifiers selected. The rheology modifier (iv) may be present in an amount from 0.01 to 5.0%, such as from 0.01 to 3%, such as 0.01 to 2%, such as 0.01 to 1%, by weight of the total components of the pigment slurry composition (b). The rheology modifier (iv) may be selected and be included in an amount such that the pigment slurry composition (b) is stable as a standalone liquid composition.

The liquid carrier (v) of the pigment slurry composition (b) may be present in an amount from 5 to 40%, such as from 15 to 40%, such as 20 to 40%, such as 30 to 40% by weight of the total components of the pigment slurry composition (b). The liquid carrier (v) may be selected and be included in an amount such that the pigment slurry composition (b) is stable as a standalone liquid composition.

Optionally, the pigment slurry composition (b) may comprise some additives, and suitable additives can include a wide variety of materials known to one having ordinary skill in the art, such as UV light absorbers, hindered amine light stabilizers (HALS), surfactants, dispersants, defoamers, biocides, glycols, pH modifier, polyvalent salts, or some combination thereof.

The pigment slurry composition (b) may be present in an amount from 0 to 50%, such as from 0 to 40%, such as from 0 to 30%, such as 0 to 20%, such as 0 to 10%, such as 1 to 50%, such as from 1 to 40%, such as from 1 to 30%, such as 1 to 20%, such as 1 to 10%, by volume of the total components of the coating composition.

The extender pigment slurry composition (c) may include: (vi) an extender pigment, (vii) optionally a rheology modifier, and (viii) a liquid carrier. The extender pigment slurry composition (c) may be resin free. The extender pigment slurry composition (c) may be free of hiding pigments. The extender pigment slurry composition (c) may include a stable slurry, i.e. a slurry that remains stable without continuous mixing. The extender pigment slurry composition (c) may include an unstable slurry, i.e. a slurry requiring continuous mixing in order to avoid solids settling to the bottom of the container.

The extender pigment (vi) may include silicon dioxide or silica, calcium carbonate, kaolin, talc, feldspar, wollastonite, dolomite, mica, nepheline syenite, barite, barium sulfate, blanc fixe, kaolinite, illite, vermiculite, chlorite, magnesium silicate, aluminum silicate, calcium silicate, magnesium alumino-silicate, sodium alumino-silicate, calcium aluminum silicate, sodium potassium aluminosilicate, calcium borosilicate, fumed alumina, alumino hydrate, alumina trihydrate (ATH), or some combination thereof. Other extender pigments may be used. As used herein, an "extender pigment" is an achromatic pigment having a refractive index between 1.4 and 1.7. Consequently, extender pigments do not significantly contribute to the hiding power of the coating composition. They are used in paint to: reduce cost, achieve durability, alter appearance (e.g., decrease in gloss), control rheology and influence other desirable properties. If used at sufficiently high concentration, an extender may contribute to dry hiding and increase reflectance. Stanley LeSota, et. al., Paint/Coatings Dictionary, Federation of Societies for Coatings Technology, 1978.

The rheology modifier (vii) in the extender pigment slurry composition (c) may be the same or different compared to the rheology modifier (iv) in the pigment slurry composition (b) and may include any of the previously described rheology modifiers or combinations thereof.

The extender pigment slurry (b) may include high solids slurries where the solid volume may be up to 85% with respect to the total components of the extender pigment slurry composition (c).

The extender pigment (vi) may be present in an amount from 15 to 85%, such as from 25 to 85%, such as 35 to 85%, such as 45 to 85%, such as 55 to 85%, such as 65 to 85%, such as 75 to 85%, by weight of the total components of the extender pigment slurry composition (c).

The rheology modifier (vii) may be present in an amount such that the settling rate is decreased (compared to the same coating composition not including the rheology modifier (iv)), but viscosity is not increased such that the coating composition is not pumpable The amount of rheology modifier used can vary depending on the rheology modifier or rheology modifiers selected. The rheology modifier (vii) may be present in an amount from 0.01 to 3.0%, such as from 0.01 to 2%, such as 0.01 to 1%, by weight of the total components of the extender pigment slurry composition (c). The rheology modifier (vii) may be selected and be included in an amount such that the extender pigment slurry composition (c) is stable as a standalone liquid composition.

The liquid carrier (viii) may be present in an amount from 5 to 85%, such as from 15 to 85%, such as 25 to 85%, such as 35 to 85%, such as 45 to 85%, such as 55 to 85%, such as 65 to 85%, such as 75 to 85%, by weight of the total components of the extender pigment slurry composition (c). The liquid carrier (viii) may be selected and be included in an amount such that the extender pigment slurry composition (c) is stable as a standalone liquid composition.

Optionally, the extender pigment slurry composition may comprise some additives, and suitable additives can include a wide variety of materials known to one having ordinary skill in the art, such as UV light absorbers, hindered amine light stabilizers (HALS), surfactants, dispersants, defoamers, biocides, glycols, pH modifier, polyvalent salts, or some combination thereof.

The extender pigment slurry composition (c) may be present in an amount from 0 to 50%, such as from 0 to 4%, such as from 0 to 30%, such as 0 to 20%, such as 0 to 10%, such as from 1 to 50%, such as from 1 to 40%, such as from 1 to 30%, such as from 1 to 20%, such as from 1 to 10% by volume of the total components of the coating composition.

The resin slurry composition (d) may include: (ix) a resin and (x) a liquid carrier. The resin slurry composition (d) may be incorporated into the coating composition in an amount sufficient to impart a desired sheen of the coating.

The resin (ix) may include a resin having acrylic. (meth) acrylic, vinyl, styrene, polyester, epoxy, urethane and/or polysiloxane groups, or combinations thereof. Suitable resins for the resin (ix) comprises acrylic resins, alkyd resins; styrene resins; styrene-acrylic resins; vinyl-acrylic resins; vinyl resins; vinyl-acetate (VEOVA™) resins; ethylene-vinyl acetate (EVA) resins; alkyd-acrylic resins; alkyd-styrene resins; vinyl toluene resins; alkyl substituted styrenes such as alpha-methyl styrene; vinyl acetate-ethylene; styrene-butadiene resins, vinyl toluene-butadiene resins; styrene-acrylonitrile resins; vinyl toluene-acrylonitrile resins, diisocyanate-polyol resins; vinyl alcohol resins; vinyl butyral resins; vinyl chloride resins, vinylidene chloride resins or combinations thereof. The resin (ix) may be present in an amount from 1 to 100%, such as from 1 to 90%, such as from 1 to 80%, such as from 1 to 70%, such as from 1 to 60%, such as from 1 to 70%, such as from 1 to 60%, such as from 1 to 50%, such as from 1 to 40%, such as from 1 to 30%, such as 1 to 20%, such as 1 to 10%, by weight of the total components of the resin slurry composition (d).

The liquid carrier (viii) in the resin slurry composition (d) may be present in an amount from 1 to 90%, such as from 1 to 80%, such as from 1 to 70%, such as from 1 to 60%, such as from 1 to 50%, such as from 1 to 40%, such as 1 to 30%, such as 1 to 20%, such as 1 to 10%, by weight of the total components of the resin slurry composition (d). The liquid carrier (viii) may be selected and be included in an amount such that the resin slurry composition (d) is stable as a standalone liquid composition. The liquid carrier (viii) may be selected such that the coating composition containing the resin slurry composition (d) is a stable composition.

Optionally, the resin slurry composition (d) may comprise some additives, and suitable additives can include a wide variety of materials known to one having ordinary skill in the art, such as UV light absorbers, hindered amine light stabilizers (HALS), surfactants, dispersants, rheology modifiers, defoamers, biocides, or some combination thereof.

The resin slurry composition (d) may be present in an amount from 0 to 50%, such as from 0 to 40%, such as from 0 to 30%, such as 0 to 20%, such as 0 to 10%, such as 1 to 50%, such as 1 to 40%, such as 1 to 30%, such as 1 to 20%, such as 1 to 10% by volume of the total components of the coating composition.

The coating composition may include (e) a colorant. The colorant may be the same or different from the hiding pigment (iii) and the extender pigment (vi). The amount of the colorant (e) used can vary depending on the desired color of the coating composition. As used herein, "colorant" refers to any substance that imparts color and/or other hiding power, opacity and/or other visual effect to the composition. The colorant may be a dye or pigment, or a concentrated pigment dispersion or paste in water, solvent, or binder. The colorant can be added to the coating in any suitable form, such as discrete particles, dispersions, solutions, effect and special effect pigments, and/or flakes. A single colorant or a mixture of two or more colorants can be used in the coatings of the present invention. The colorant may include a solid colorant, but principally may be provided in a liquid carrier.

The coating composition may include filler slurry composition (f) having a liquid carrier, rheology modifier, and/or extender pigment which may be the same or different from the extender pigment (vi) from the extender pigment slurry composition (c). The rheology modifier of the filler slurry composition (f) may include any of the previously described rheology modifiers. The rheology modifier may include a HASE rheology modifier. The filler slurry composition (f) may be present in an amount 0 to 20%, such as 0 to 15%, such as 0 to 10%, such as 0 to 5%, such as 0 to 3%, such as from 1 to 20%, such as from 1 to 15%, such as from 1 to 10%, such as from 1 to 5%, such as from 1 to 3% by volume of the total components of the coating composition. The amount or composition of filler slurry composition (f) may be added to the coating composition to achieve a desired volume or viscosity of the coating composition.

The pigment slurry composition (b) and/or the extender pigment slurry composition (c) and/or the resin slurry composition (d) and/or the filler slurry composition (f) comprises a stable slurry that remains liquid and is pumpable over time.

The hiding pigment-free basecoat composition (a) and/or the pigment slurry composition (b) and/or the extender pigment slurry (c) and/or the resin slurry composition (d) and/or the filler slurry composition (f) and/or the colorant (e) are compatible with one another such that, they could be added to the same coating without cause adverse effects to performance or stability of the liquid coating composition and/or the cured coating.

The liquid carrier in any of the hiding pigment-free basecoat composition (a), and/or the pigment slurry composition (b), and/or the extender pigment slurry (c), and/or the resin slurry composition (d), and/or the filler slurry composition (f) may be the same or a different liquid carrier. The rheology modifier in any of the pigment slurry composition (b), and/or the extender pigment slurry (c), and/or the filler slurry composition (f) may be the same or a different rheology modifier. The resin in the hiding pigment-free basecoat composition (a) and/or the resin slurry composition (d) may be the same or different resin.

The coating composition as described herein may be prepared from a coating system comprising a plurality of separate components. The coating system may include the hiding pigment-free basecoat composition (a) and the pigment slurry composition (b) and/or the extender pigment slurry composition (c). The rheology modifier of the pigment slurry composition (b) and/or the extender pigment slurry composition (c) may include an organic rheology modifier and an inorganic rheology modifier. The coating system may include the resin slurry composition (d) as a separate component. The coating system may include the colorant (e) as a separate component. The coating system may include the filler slurry composition (f) as a separate component. The separate components in the coating system may not be mixed together. The separate components may be stored in separate containers of a dispensing system (see dispensing device 15 from FIGS. 1A-2B). To form the coating composition, the separate components may be added to a container and mixed.

The coating composition as described herein may be prepared from a coating system comprising a plurality of separate components. The coating system may include the hiding pigment-free basecoat composition (a), and at least two of (b)-(d): the pigment slurry composition (b), and the extender pigment slurry composition (c), and the resin slurry composition (d) as a separate component. The at least two of (b)-(d) may include (b) and (c). The at least two of (b)-(d) may include (b), (c), and (d). The at least two of (b)-(d) may include (c) and (d). The at least two of (b)-(d) may include (b) and (d). The coating system may include the colorant (e) as a separate component. The coating system may include the filler slurry composition (f) as a separate component. The separate components in the coating system may not be mixed together. The separate components may be stored in separate containers of a dispensing system (see dispensing device 15 from FIGS. 1A-2B). To form the coating composition, the separate components may be added to a container and mixed.

The coating composition as described herein may be suitably prepared using an in-store tinting system, in-plant tinting systems, and/or a portable and/or mobile tinting systems.

The coating compositions prepared according the coating system of the present invention may be applied to a substrate by conventional techniques such as spraying, brushing and roll coating. The coating compositions can be applied to any substrates known in the art, such as, architectural substrates, such as roofs, bricks, vinyl siding, concrete, cement board, MDF (medium density fiberboard) and particle board, gypsum board, wood, stone, metal, plastics, wall paper and textile, etc., which may be pre-primed by waterborne or solvent borne primers, automotive substrates, marine substrates, industrial substrates, packaging substrates, wood flooring and furniture, apparel, electronics including housings and circuit boards and including consumer electronics such as housings for computers, notebooks, smartphones, tablets, televisions, gaming equipment, computer equipment, computer accessories, MP3 players, glass and transparencies, sports equipment including golf balls, and the like. The architectural substrate may be an interior or exterior wall of a building or residence and/or a ceiling thereof. Accordingly, the present invention is further directed to a substrate coated at least in part with any of the coating compositions described above. These substrates can be metallic or non-metallic. Metallic substrates include tin, steel, tin-plated steel, chromium passivated steel, galvanized steel, aluminum, and aluminum foil. Metal sheet as used herein refers to flat metal sheet and coiled metal sheet, which is coiled, uncoiled for coating and then re-coiled for shipment to a manufacturer. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) ("PET"), polycarbonate, polycarbonate acrylobutadiene styrene ("PC/ABS"), polyamide, wood, veneer, wood composite, particle board, medium density fiberboard, cement, stone, glass, paper, cardboard, textiles, leather both synthetic and natural, and the like.

The coating compositions may be prepared in a wide range of colors including white, medium, deep, accent, intense, or some combination thereof. As used herein, these colors correspond to a specific quantity or range of quantities of white hiding pigment (e.g., $TiO_2$) contained in the resulting coating composition, with the quantity or range of quantities depending on the coating line of the coating composition. The colors have an amount of hiding pigment from highest to lowest as follows: white, medium, deep, accent, intense.

The coating compositions may exhibit a wide range of sheens, including flat/matte, velvet-like, eggshell, satin, semi-gloss, gloss, high-gloss, or some combination thereof. The sheens may be defined based on at least one gloss reflectance measurement of the resulting coating as follows, with the measurements for gloss values carried out based on ASTM D523:

| Sheen | 60° Gloss | | 85° Gloss |
|---|---|---|---|
| Flat/matte | 5 units | and | <10 units |
| Velvet-like | <10 units | and | 10-35 units |
| Eggshell | 10-25 units | and | 10-35 units |
| Satin | 20-35 units | and | >35 units |
| Semi-gloss | 35-70 units | — | — |
| Gloss | 70-85 units | — | — |
| High-gloss | >85 units | — | — |

The hiding pigment-free basecoat (a) may be selected based on the desired sheen of the coating composition. The same hiding pigment-free basecoat composition (a) may be selected for any desired color or sheen of the coating composition, such that a single hiding pigment-free basecoat composition (a) is required for any desired color and/or sheen.

The amount of the pigment slurry composition (b) and/or the extender pigment slurry composition (c) and/or resin slurry composition (d) used may vary depending on the color and the hiding pigment-free basecoat composition (a) selected. White color or lights pastel color coating compositions may contain low or zero amount of the extender pigment slurry composition (c). Deep fully pigmented colors may contain low or zero amount of the pigment slurry composition (b). The resin slurry composition (d) may, at least in part, impart the desired sheen to the coating composition.

The amount of the pigment slurry composition (b) and/or the extender pigment slurry composition (c) and/or the resin slurry composition (d) used may vary depending on the desired color and/or sheen of the coating composition.

The above-described coating composition may be prepared by mixing the various separate components (some combination of separate components (a)-(f) described above) together in container.

Each of the hiding pigment-free basecoat composition (a); the pigment slurry composition (b) and/or the extender pigment slurry composition (c); optionally the colorant (e), and optionally the filler slurry composition (f) may be separately stored. These separately stored components may each be standalone stable liquid compositions that are pumpable. Upon combination and mixing of some selection of these components, the coating composition is formed. The hiding pigment-free basecoat composition (a) may be selected based on the desired sheen, however any of the hiding pigment-free basecoat compositions (a) may be suitable for the desired color. Thus the hiding pigment-free basecoat composition (a) may be selected irrespective of desired color and may be selected based on sheen (e.g., choose a gloss hiding pigment-free basecoat composition (a) if a gloss coating is desired and a matte hiding pigment-free basecoat composition (a) if a matte coating is desired, no matter what color is desired). The amounts and compositions of the components may be selected based on the desired color and/or sheen.

Each of the hiding pigment-free basecoat composition (a); the pigment slurry composition (b) and/or the extender pigment slurry composition (c); and/or the resin slurry composition (d); optionally the colorant (e), and the optionally the filler slurry composition (f) may be separately stored. These separately stored components may each be standalone stable liquid compositions that are pumpable. Upon combination and mixing of these components, the coating composition is formed. A single hiding pigment-free basecoat composition (a) may be selected regardless of the desired color or sheen because the resin slurry composition (d), at least in part, imparts the desired sheen, while the pigments of the various components imparts the desired color. Thus the hiding pigment-free basecoat composition (a) may be selected irrespective of desired color and sheen (e.g., the same hiding pigment-free basecoat composition (a) is chosen for a gloss coating and a matte coating, no matter what color is desired). The amounts and compositions of the components may be selected based on the desired color and/or sheen.

The coating composition may be prepared using any suitable tinting system having a delivery system to combine the various separate components in a container for mixing to form the coating composition. FIGS. 1A-2B show non-limiting examples of a tinting system 10 for preparing the coating composition. Other arrangements for combining the various separate components are within the scope of the invention.

Referring to FIG. 1A, the tinting system 10 may include a container 12, such as a bucket or other container suitable for holding the coating composition. The container 12 may hold a hiding pigment-free basecoat composition (a) 14 as described above. The tinting system 10 may further include a dispensing device 15 configure to dispense the contents therein into the container 12. The components may be contained within a chamber of the dispensing device 15, or the components may be physically stored in containers outside of the dispensing device 15, but include flow lines to dispense the various components through the dispensing device 15 and into the container 12.

With continued reference to FIG. 1A, separate containers may be included in the dispensing device 15 for the previously described pigment slurry composition (b) 16, the extender pigment slurry composition (c) 18, the filler slurry composition (f) 20, and the colorant (e) 22. The colorant (e) 22 in the dispensing device 15 may include a plurality of colorants added alone or in combination with one another to achieve the desired color. The dispensing device 12 may include 12 colorants. Each of these components may be standalone stable liquid compositions that are pumpable. The dispensing device 15 may include a system of pumps (not shown), pipes 24, outlets 26, and valves 28 for pumping the respective components from their separate containers into the container 12 to be mixed to form the coating composition. The system of pipes 24 may place each component in fluid communication with the container 12. A mixer (not shown) may mix the contents included in the container 12. The dispensing device 15 may not include the colorant (e) container 22, but a second dispensing device 15 is used that includes the colorant (e) container 22. The outlet 26 may be the outlet from which each component exits the dispensing device 15 to flow into the container 12. The valves 28 may be used to adjust which component is flowed into the container 12, the amount of the component flowed into the container 12, and the flow rate of the component being flowed into the container 12. The tinting system 10 is configured to add the various separate components in the correct amount and composition so as to form a coating composition having desired color and sheen specifications, such as a desired color and/or sheen specified by a customer.

Figure 1B:
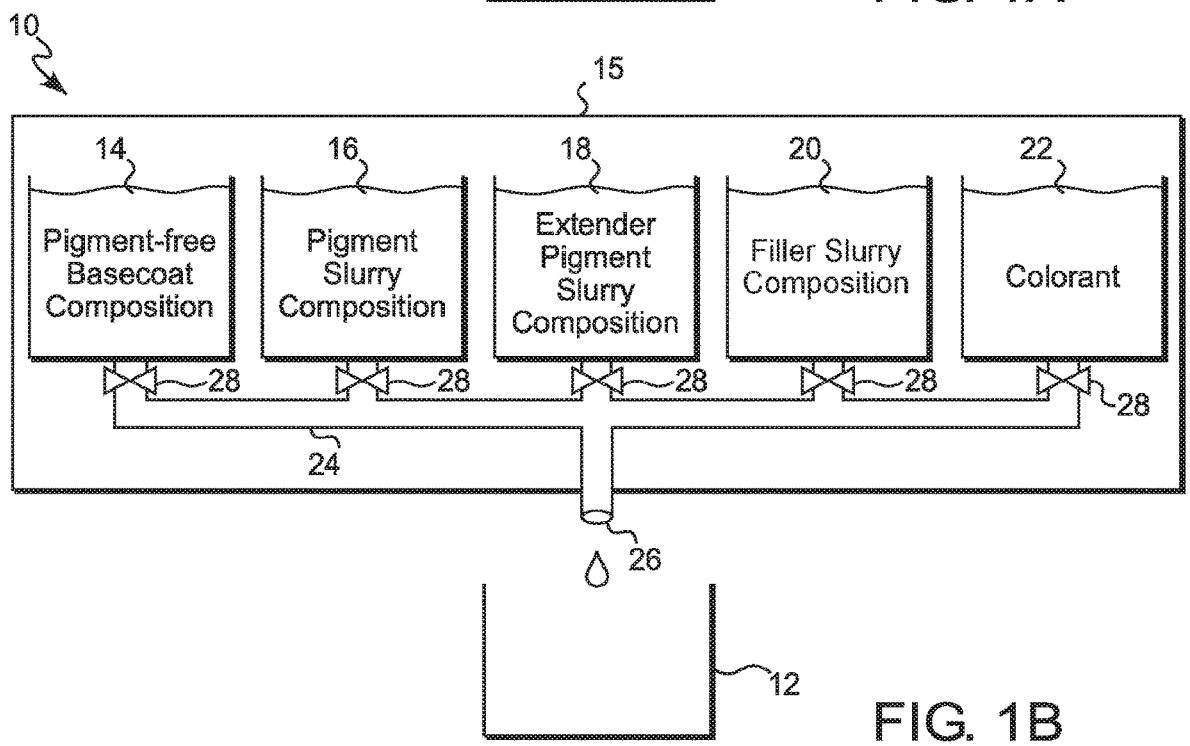
FIG. 1B shows another tinting system according to the present invention.

FIG. 1B is identical to FIG. 1A except in the ways described hereinafter. In FIG. 1B, the container 12 is empty. A different container(s) containing the hiding pigment-free basecoat composition(s) (a) 14 is included as a separate component in the dispensing device 15, as shown.

Figure 2A:
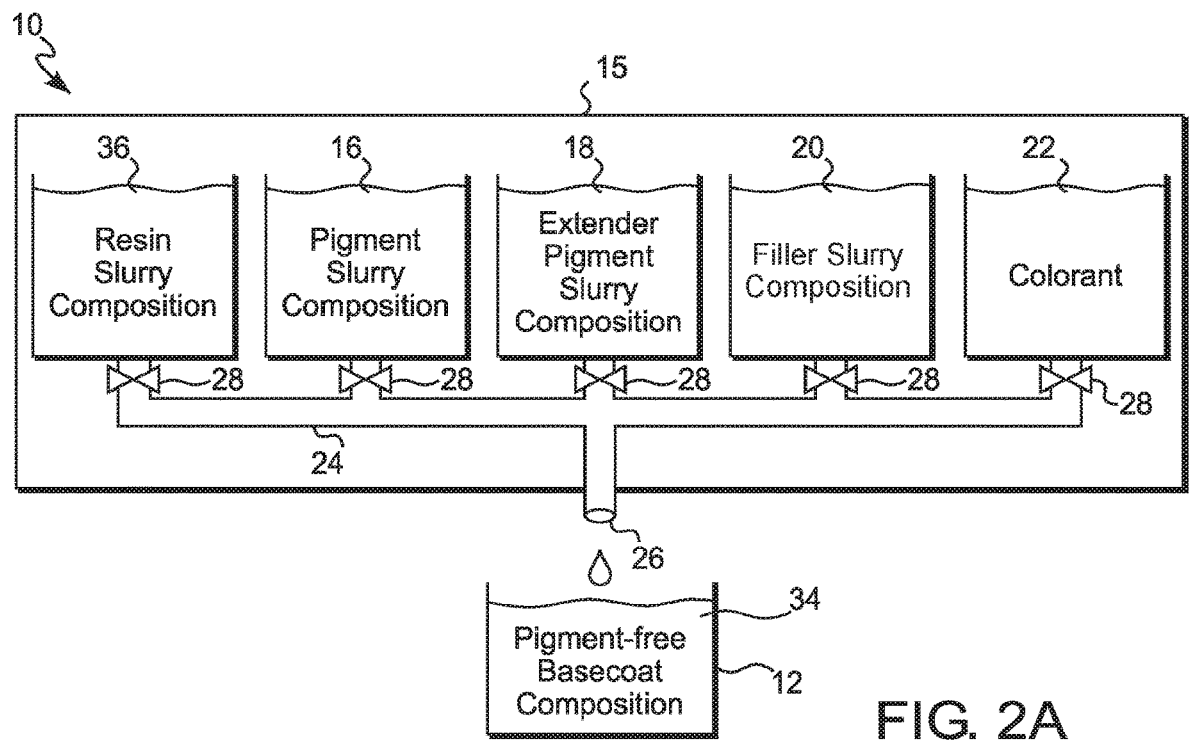
FIG. 2A shows another tinting system according to the present invention.

FIG. 2A is identical to FIG. 1A except in the ways described hereinafter. In FIG. 2A, the hiding pigment-free basecoat composition (a) 34 may be the same or different from the hiding pigment-free basecoat composition (a) 14 from FIG. 1A. In one non-limiting example, they are different. The hiding pigment-free basecoat composition (a) 14 may be suitable to impart a specific sheen to the coating composition, while the hiding pigment-free basecoat composition (a) 34 may be suitable for a coating composition of any sheen. This may be because the hiding pigment-free basecoat composition (a) 34 does not include the total amount of resin that, in part, imparts a specific sheen to a coating composition, while that resin is included in the hiding pigment-free basecoat composition (a) 14 from FIG. 1A. Thus, the hiding pigment-free basecoat composition (a) 34 from FIG. 2A may be the different from the hiding pigment-free basecoat composition (a) 14 from FIG. 1A and may be used regardless of desired sheen. It will be appreciated that the hiding pigment-free basecoat composition (a) 34 from FIG. 2A and the hiding pigment-free basecoat composition (a) 14 from FIG. 1A may be used regardless of desired color (e.g., for both a pastel color and a mid-tone color).

With continued reference to FIG. 2A, an additional component is included in the dispensing device 15, which component is the previously-described resin slurry composition (d) 36. The resin slurry composition (d) 36 may be selected in composition and/or amount to impart the desired sheen. Several resin slurry compositions (d) 36 may be combined to form a mix of sheen (e.g., a sheen between a gloss coating and a satin coating).

Figure 2B:
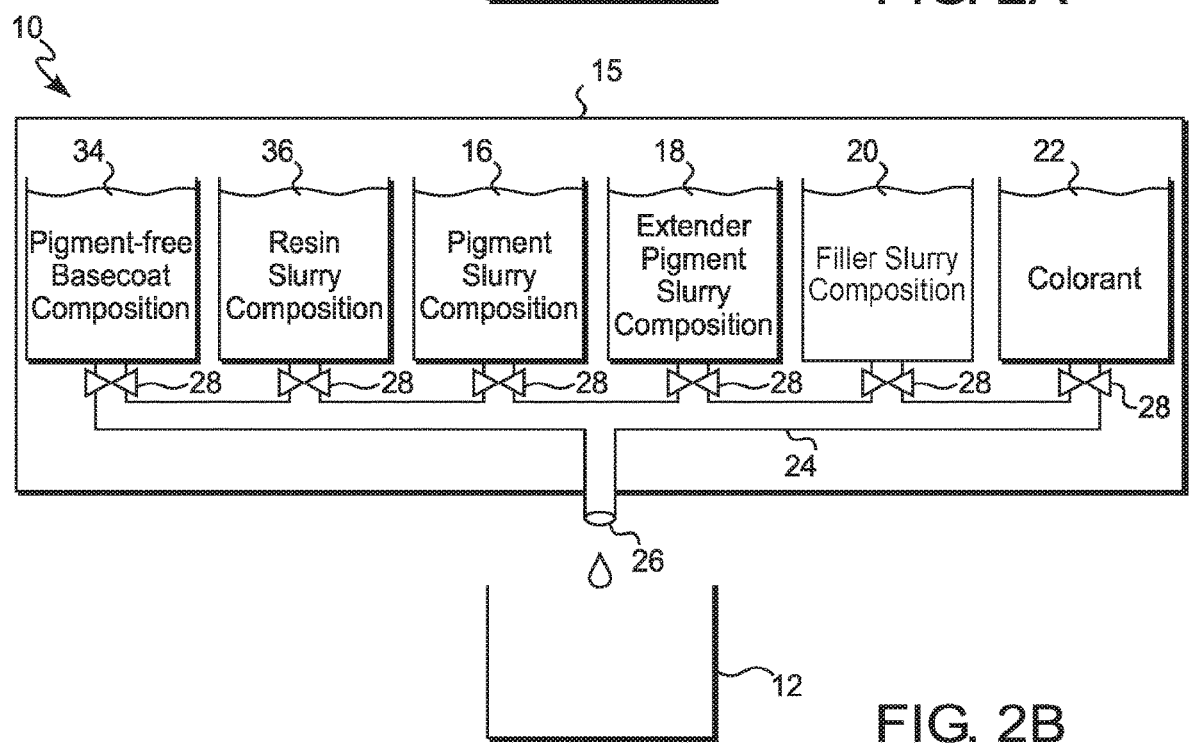
FIG. 2B shows another tinting system according to the present invention.

FIG. 2B is identical to FIG. 2A except in the ways described hereinafter. In FIG. 2B, the container 12 is empty. A different container containing the hiding pigment-free basecoat composition (a) 34 is included as a separate component in the dispensing device 15, as shown.

The tinting system 10 described herein may be used in-store or in-plant to prepare a customized coating composition (having a desired sheen and/or color) for a customer. The present invention simplifies preparation of the customized coating composition, as fewer hiding pigment-free basecoat compositions (a) are required in-store or in-plant to prepare the customized coating composition because the various separate components in the tinting system 10 are capable of imparting the desired color and/or sheen on site.

A coating composition preparation kit for preparing a coating composition as described herein may include the following as separate components: the hiding pigment-free basecoat composition (a) and the pigment slurry composition (b) and/or the extender pigment slurry composition (c). The kit may include the resin slurry composition (d) as a separate component. The kit may include the colorant (e) as a separate component. The kit may include the filler slurry composition (f) as a separate component. The separate components in the kit may not be mixed together. The separate components of the kit may be stored in separate containers of a dispensing system (see dispensing device 15 from FIGS. 1A-2B). To form the coating composition, the separate components of the kit may be added to a container and mixed.

A coating composition preparation kit for preparing a coating composition as described herein may include the following as separate components: the hiding pigment-free basecoat composition (a), and at least two of (b)-(d): the pigment slurry composition (b), and the extender pigment slurry composition (c), and the resin slurry composition (d). The kit may include the colorant (e) as a separate component. The kit may include the filler slurry composition (f) as a separate component. The separate components in the kit may not be mixed together. The separate components of the kit may be stored in separate containers of a dispensing system (see dispensing device 15 from FIGS. 1A-2B). To form the coating composition, the separate components of the kit may be added to a container and mixed.

The present invention further includes the subject matter of the following clauses:

Clause 1: A coating composition comprising a mixture of: (a) a hiding pigment-free basecoat composition, comprising: (i) a basecoat resin; and (ii) a liquid carrier; and (b) and/or (c) as follows: (b) a pigment slurry composition, comprising: (iii) a hiding pigment; (iv) a rheology modifier; and (v) a liquid carrier; (c) an extender pigment slurry composition, comprising: (vi) an extender pigment; (vii) a rheology modifier; and (viii) a liquid carrier, wherein the rheology modifier (iv) and/or (vii) comprises an organic rheology modifier and an inorganic rheology modifier.

Clause 2: The coating composition of clause 1, further comprising (d) a resin slurry composition, comprising: (ix) a resin; and (x) a liquid carrier.

Clause 3: The coating composition of clause 1 or 2, wherein the hiding pigment-free basecoat composition (a) is present in an amount from 40 to 95 vol. %, based on the total volume of the coating composition.

Clause 4: The coating composition of any of clauses 1-3, wherein the pigment slurry composition (b) is present in an amount from 1 to 50 vol. %, based on the total volume of the coating composition.

Clause 5: The coating composition of any of clauses 1-4, wherein the extender pigment slurry composition (c) is present in an amount from 1 to 50 vol. %, based on the total volume of the coating composition.

Clause 6: The coating composition of any of clauses 2-5, wherein the resin slurry composition (d) is present in an amount from 1 to 50 vol. %, based on the total volume of the coating composition.

Clause 7: The coating composition of any of clauses 1-6, wherein the basecoat resin (i) comprises acrylic, (meth) acrylic, vinyl, styrene, polyester, epoxy, urethane, or polysiloxane groups, or some combination thereof.

Clause 8: The coating composition of any of clauses 2-7, wherein the resin (ix) comprises acrylic, (meth)acrylic, vinyl, styrene, polyester, epoxy, urethane, or polysiloxane groups, or some combination thereof.

Clause 9: The coating composition of any of clauses 2-8, wherein the resin (ix) is compatible with the basecoat resin (i).

Clause 10: The coating composition of any of clauses 1-9, wherein the hiding pigment (iii) comprises titanium dioxide and/or zinc oxide.

Clause 11: The coating composition of any of clauses 1-10, wherein the extender pigment (vi) comprises silicon dioxide, calcium carbonate, kaolin, talc, feldspar, wollastonite, mica, or some combination thereof.

Clause 12: The coating composition of any of clauses 1-11, wherein the pigment slurry composition (b) and/or the extender pigment slurry composition (c) are resin-free.

Clause 13: The coating composition of any of clauses 1-12, further comprising a hydrophobically modified alkali swellable emulsion (HASE) rheology modifier.

Clause 14: The coating composition of any of clauses 1-13, wherein the coating composition further comprises (e) a colorant.

Clause 15: The coating composition of any of clauses 1-14, wherein the coating composition further comprises (f) a filler slurry composition, comprising a liquid carrier, a rheology modifier, and/or an extender pigment.

Clause 16: A coating composition, comprising a mixture of: (a) a hiding pigment-free basecoat composition, comprising: (i) a basecoat resin; and (ii) a liquid carrier; (b) a resin-free pigment slurry composition, comprising: (iii) a hiding pigment; and (iv) a liquid carrier; and (c) a resin-free extender pigment slurry composition, comprising: (v) an extender pigment; and (vi) a liquid carrier.

Clause 17: The coating composition of clause 16, further comprising (d) a resin slurry composition, comprising: (vii) a resin; and (viii) a liquid carrier.

Clause 18: The coating composition of clause 16 or 17, wherein the hiding pigment-free basecoat composition (a) is present in an amount from 40 to 95 vol. %, based on the total volume of the coating composition.

Clause 19: The coating composition of any of clauses 16-18, wherein the resin-free pigment slurry composition (b) is present in an amount from 1 to 50 vol. %, based on the total volume of the coating composition.

Clause 20: The coating composition of any of clauses 16-19, wherein the resin-free extender pigment slurry composition (c) is present in an amount from 1 to 50 vol. %, based on the total volume of the coating composition.

Clause 21: The coating composition of any of clauses 17-20, wherein the resin slurry composition (d) is present in an amount from 1 to 50 vol. %, based on the total volume of the coating composition.

Clause 22: The coating composition of any of clauses 16-21, wherein the basecoat resin (i) comprises acrylic, (meth)acrylic, vinyl, styrene, polyester, epoxy, urethane, or polysiloxane groups, or some combination thereof.

Clause 23: The coating composition of any of clauses 17-22, wherein the resin (vii) comprises acrylic, (meth) acrylic, vinyl, styrene, polyester, epoxy, urethane, or polysiloxane groups, or some combination thereof.

Clause 24: The coating composition of any of clauses 17-23, wherein the resin (vii) is compatible with the basecoat resin (i).

Clause 25: The coating composition of any of clauses 16-24, wherein the hiding pigment (iii) comprises titanium dioxide and/or zinc oxide.

Clause 26: The coating composition of any of clauses 16-25, wherein the extender pigment (vi) comprises silicon dioxide, calcium carbonate, kaolin, talc, feldspar, wollastonite, mica, or some combination thereof.

Clause 27: The coating composition of any of clauses 16-26, wherein the resin-free pigment slurry composition (b) and/or the resin-free extender pigment slurry composition (c) comprise a rheology modifier, wherein the rheology modifier comprises an organic rheology modifier and an inorganic rheology modifier.

Clause 28: The coating composition of any of clauses 16-27, further comprising a hydrophobically modified alkali swellable emulsion (HASE) rheology modifier.

Clause 29: The coating composition of any of clauses 16-28, wherein the coating composition further comprises (e) a colorant.

Clause 30: The coating composition of any of clauses 16-29, wherein the coating composition further comprises (f) a filler slurry composition, comprising a liquid carrier, a rheology modifier, and/or an extender pigment.

Clause 31: A method of preparing a coating composition, comprising mixing the following separate components together in a container: (a) a hiding pigment-free basecoat composition, comprising: (i) a basecoat resin, and (ii) a liquid carrier; and (b) and/or (c) as follows: (b) a pigment slurry composition, comprising: (iii) a hiding pigment; (iv) a rheology modifier; and (v) a liquid carrier; (c) an extender pigment slurry composition, comprising: (vi) an extender pigment; (vii) a rheology modifier; and (viii) a liquid carrier, wherein the rheology modifier (iv) and/or (vii) comprises an organic rheology modifier and an inorganic rheology modifier.

Clause 32: The method of clause 31, wherein the separate components further comprise: (d) a resin slurry composition, comprising: (ix) a resin; and (x) a liquid carrier.

Clause 33: The method of clause 31 or 32, wherein the separate components further comprise: (e) a colorant.

Clause 34: The method of any of clause 31-33, wherein an amount and/or composition of at least one of the separate components is selected and/or added based on desired color and/or sheen of the coating composition.

Clause 35: The method of clause 34, wherein the hiding pigment-free basecoat composition (a) selected is the same regardless of the color and/or sheen of the coating composition.

Clause 36: A method of preparing a coating composition, comprising mixing the following separate components together in a container: (a) a hiding pigment-free basecoat composition, comprising: (i) a basecoat resin; and (ii) a liquid carrier; (b) a resin-free pigment slurry composition, comprising: (iii) a hiding pigment and (iv) a liquid carrier; and (c) a resin-free extender pigment slurry composition, comprising: (v) an extender pigment and (vi) a liquid carrier.

Clause 37: The method of clause 36, wherein the separate components further comprise: (d) a resin slurry composition, comprising: (vii) a resin; and (viii) a liquid carrier.

Clause 38: The method of clause 36 or 37, wherein the separate components further comprise: (e) a colorant.

Clause 39: The method of any of clauses 36-38, wherein an amount and/or composition of at least one of the separate components is selected and/or added based on desired color and/or sheen of the coating composition.

Clause 40: The method of clause 39, wherein the hiding pigment-free basecoat composition (a) selected is the same regardless of the color and/or sheen of the coating composition.

Clause 41: A system for preparing a configurable coating composition, comprising an apparatus configured to mix a combination of the following separate components contained in the system: (a) a hiding pigment-free basecoat composition, comprising: (i) a basecoat resin; and (ii) a liquid carrier; and (b) and/or (c) as follows: (b) a pigment slurry composition, comprising: (iii) a hiding pigment; (iv) a rheology modifier; and (v) a liquid carrier; (c) an extender pigment slurry composition, comprising: (vi) an extender pigment; (vii) a rheology modifier; and (viii) a liquid carrier, wherein the rheology modifier (iv) and/or (vii) comprises an organic rheology modifier and an inorganic rheology modifier.

Clause 42: A system for preparing a configurable coating composition, comprising an apparatus configured to mix a combination of the following separate components contained in the system: (a) a hiding pigment-free basecoat composition, comprising: (i) a basecoat resin; and (ii) a liquid carrier; (b) a resin-free pigment slurry composition, comprising: (iii) a hiding pigment; and (iv) a liquid carrier; and (c) a resin-free extender pigment slurry composition, comprising: (v) an extender pigment; and (vi) a liquid carrier.

Clause 43: A coating system, comprising as separate components: (a) a hiding pigment-free basecoat composition, comprising: (i) a basecoat resin; and (ii) a liquid carrier; and (b) and/or (c) as follows: (b) a pigment slurry composition, comprising: (iii) a hiding pigment; (iv) a rheology modifier; and (v) a liquid carrier; (c) an extender pigment slurry composition, comprising: (vi) an extender pigment; (vii) a rheology modifier; and (viii) a liquid carrier, wherein the rheology modifier (iv) and/or (vii) comprises an organic rheology modifier and an inorganic rheology modifier, wherein the separate components are not mixed together.

Clause 44: The coating system of clause 43, further comprising as a separate component, (d) a resin slurry composition, comprising: (ix) a resin; and (x) a liquid carrier.

Clause 45: The coating system of clause 44, wherein, when mixed, the resin (ix) is compatible with the basecoat resin (i).

Clause 46: The coating system of any of clauses 43-45, wherein the pigment slurry composition (b) and/or the extender pigment slurry composition (c) are resin-free.

Clause 47: The coating system of any of clauses 43-46, wherein the rheology modifier (iv) and/or (vii) comprises a hydrophobically modified alkali swellable emulsion (HASE) rheology modifier.

Clause 48: The coating system of any of clauses 43-47, further comprising as a separate component, (e) a colorant.

Clause 49: The coating system of any of clauses 43-48, further comprising as a separate component, (f) a filler slurry composition, comprising a liquid carrier, a rheology modifier, and/or an extender pigment.

Clause 50: The coating system of any of clauses 43-49, wherein each of the separate components are stored in a separate container in a dispensing device.

Clause 51: A coating system, comprising as separate components: (a) a hiding pigment-free basecoat composition, comprising: (i) a basecoat resin; and (ii) a liquid carrier; and at least two of (b)-(d); (b) a resin-free pigment slurry composition, comprising: (iii) a hiding pigment; and (iv) a liquid carrier; (c) a resin-free extender pigment slurry composition, comprising: (v) an extender pigment; and (vi) a liquid carrier, wherein the separate components are not mixed together; and (d) a resin slurry composition, comprising: (vii) a resin; and (viii) a liquid carrier.

Clause 52: The coating system of clause 51, further comprising as a separate component, (d) a resin slurry composition, comprising: (vii) a resin; and (viii) a liquid carrier.

Clause 53: The coating system of clause 52, wherein, when mixed, the resin (vii) is compatible with the basecoat resin (i).

Clause 54: The coating system of any of clauses 51-53, wherein the resin-free pigment slurry composition (b) and/or the resin-free extender pigment slurry composition (c) comprises a rheology modifier, wherein the rheology modifier comprises an organic rheology modifier and an inorganic rheology modifier.

Clause 55: The coating system of any of clauses 51-54, wherein the resin-free pigment slurry composition (b) and/or the resin-free extender pigment slurry composition (c) comprises a hydrophobically modified alkali swellable emulsion (HASE) rheology modifier.

Clause 56: The coating system of any of clause 51-55, further comprising as a separate component, (e) a colorant.

Clause 57: The coating system of any of clauses 51-56, further comprising as a separate component, (f) a filler slurry composition, comprising a liquid carrier, a rheology modifier, and/or an extender pigment.

Clause 58: The coating system of any of clauses 51-57, wherein each of the separate components are stored in a separate container in a dispensing device.

Clause 59: A method of preparing a coating composition, comprising mixing the following separate components from Option 1 or Option 2 together in a container to form the coating composition: Option 1: (a) a hiding pigment-free basecoat composition, comprising: (i) a basecoat resin; and (ii) a liquid carrier; and (b) and/or (c) as follows: (b) a pigment slurry composition, comprising: (iii) a hiding pigment; (iv) a rheology modifier; and (v) a liquid carrier; (c) an extender pigment slurry composition, comprising: (vi) an extender pigment; (vii) a rheology modifier; and (viii) a liquid carrier, wherein the rheology modifier (iv) and/or (vii) comprises an organic rheology modifier and an inorganic rheology modifier; Option 2: (a) a hiding pigment-free basecoat composition, comprising: (i) a basecoat resin; and (ii) a liquid carrier; and at least two of (b)-(d); (b) a resin-free pigment slurry composition, comprising: (iii) a hiding pigment; and (iv) a liquid carrier; and (c) a resin-free extender pigment slurry composition, comprising: (v) an extender pigment; and (vi) a liquid carrier; and (d) a resin slurry composition, comprising: (vii) a resin; and (viii) a liquid carrier, wherein the separate components are not mixed together until added to the container.

Clause 60: The method of clause 59, wherein the separate components further comprise (d) a resin slurry composition, comprising: (ix) a resin; and (x) a liquid carrier.

Clause 61: The method of clause 59 or 60, wherein the separate components further comprise (e) a colorant.

Clause 62: The method of any of clauses 59-61, wherein the separate components further comprise (f) a filler slurry composition, comprising a liquid carrier, a rheology modifier, and/or an extender pigment.

Clause 63: The method of any of clauses 59-62, wherein the hiding pigment-free basecoat composition (a) is mixed in the container in an amount from 40 to 95 vol. %, based on the total volume of the coating composition.

Clause 64: The method of any of clauses 59-63, wherein the pigment slurry composition (b) is mixed in the container in an amount from 1 to 50 vol. %, based on the total volume of the coating composition.

Clause 65: The method of any of clauses 59-64, wherein the extender pigment slurry composition (c) is mixed in the container in an amount from 1 to 50 vol. %, based on the total volume of the coating composition.

Clause 66: The method of any of clauses 60-65, wherein the resin slurry composition (d) is mixed in the container in an amount from 1 to 50 vol. %, based on the total volume of the coating composition.

Clause 67: The method of any of clauses 59-66, wherein the pigment slurry composition (b) and/or the extender pigment slurry composition (c) are resin-free.

Clause 68: A coating composition preparation kit, comprising as separate components: (a) a hiding pigment-free basecoat composition, comprising: (i) a basecoat resin, and (ii) a liquid carrier; and (b) and/or (c) as follows: (b) a pigment slurry composition, comprising: (iii) a hiding pigment; (iv) a rheology modifier; and (v) a liquid carrier; (c) an extender pigment slurry composition, comprising: (vi) an extender pigment; (vii) a rheology modifier; and (viii) a liquid carrier, wherein the rheology modifier (iv) and/or (vii) comprises an organic rheology modifier and an inorganic rheology modifier, wherein the separate components are not mixed together.

Clause 69: The kit of clause 68, further comprising as a separate component, (d) a resin slurry composition, comprising: (ix) a resin; and (x) a liquid carrier.

Clause 70: The kit of clause 69, wherein, when mixed, the resin (ix) is compatible with the basecoat resin (i).

Clause 71: The kit of any of clauses 68-70, wherein the pigment slurry composition (b) and/or the extender pigment slurry composition (c) are resin-free.

Clause 72: The kit of any of clauses 68-71, wherein the rheology modifier (iv) and/or (vii) comprises a hydrophobically modified alkali swellable emulsion (HASE) rheology modifier.

Clause 73: The kit of any of clauses 68-72, further comprising as a separate component, (e) a colorant.

Clause 74: The kit of any of clauses 68-73, further comprising as a separate component. (f) a filler slurry composition, comprising a liquid carrier, a rheology modifier, and/or an extender pigment.

Clause 75: A coating composition preparation kit, comprising as separate components: (a) a hiding pigment-free basecoat composition, comprising: (i) a basecoat resin; and (ii) a liquid carrier; (b) a resin-free pigment slurry composition, comprising: (iii) a hiding pigment; and (iv) a liquid carrier; and (c) a resin-free extender pigment slurry composition, comprising: (v) an extender pigment; and (vi) a liquid carrier, wherein the separate components are not mixed together.

Clause 76: The kit of clause 75, further comprising as a separate component, (d) a resin slurry composition, comprising: (vii) a resin; and (viii) a liquid carrier.

Clause 77: The kit of clause 76, wherein, when mixed, the resin (vii) is compatible with the basecoat resin (i).

Clause 78: The kit of any of clauses 75-77, wherein the resin-free pigment slurry composition (b) and/or the resin-free extender pigment slurry composition (c) comprises a rheology modifier, wherein the rheology modifier comprises an organic rheology modifier and an inorganic rheology modifier.

Clause 79: The kit of any of clauses 75-78, wherein the resin-free pigment slurry composition (b) and/or the resin-free extender pigment slurry composition (c) comprises a hydrophobically modified alkali swellable emulsion (HASE) rheology modifier.

Clause 80: The kit of any of clauses 75-79, further comprising as a separate component. (e) a colorant.

Clause 81: The kit of any of clauses 75-80, further comprising as a separate component, (f) a filler slurry composition, comprising a liquid carrier, a rheology modifier, and/or an extender pigment.

Clause 82: The kit of any of clauses 75-81, wherein each of the separate components are stored in a separate container in a dispensing device.

Clause 83: A substrate at least partially coated with a coating formed from a coating composition prepared from combination of separate components from the coating system of any of clauses 43-58.

Clause 84: An interior or exterior wall or a ceiling at least partially coated with a coating formed from a coating composition prepared from combination of separate components from the coating system of any of clauses 43-58.

Clause 85: A method of preparing a coating composition, comprising mixing separate components the coating system of any of clauses 43-58.

Clause 86: A coating composition prepared by mixing separate components from the coating system of any of clauses 43-58.

EXAMPLES

The following examples are presented to demonstrate the general principles of the invention. The invention should not be considered as limited to the specific examples presented. All parts and percentages in the examples are by weight unless otherwise indicated.

Example 1

Hiding Pigment-Free Basecoat Compositions

Three hiding pigment-free basecoat compositions were prepared including the components shown in Table 1. Water, OROTAN 1124, ULTRANEX NP 100, dimethyl ethanolamine, FOAMASTER MO 2111, and ACRYSOL RM-2020 or RM-5000 were added to a disperser and mixed at 350 RPM using a Cowles blade of 2 inches in diameter; the blend was mixed until a homogeneous solution was obtained. After that, OMYALENE SJ and MERGAL 395 were incorporated into the disperser, and it was stirred for 15 minutes at 750 RPM. After mixing, the speed of the blade was reduced to 350 RPM. At such speed, the rest of the components listed in Table 1 for each hiding pigment-free basecoat composition were slowly added to the disperser. It was dispersed for 30 minutes to obtain the final hiding pigment-free basecoat composition.

TABLE 1

| Hiding Pigment-free Basecoat Composition | Component | Grams |
|---|---|---|
| Vinyl-acrylic | Water | 345.0 |
| | OROTAN 1124[1] | 0.4 |
| | ULTRANEX NP 100[2] | 1.5 |
| | Dimethyl ethanolamine | 3.0 |
| | FOAMASTER MO 2111[3] | 3.3 |
| | ACRYSOL RM-2020[4] | 8.4 |
| | OMYALENE SJ[5] | 35.1 |
| | MERGAL 395[6] | 1.1 |
| | HALTANOL[7] | 17.1 |
| | AF2540 Emulsion[8] | 11.0 |

TABLE 1-continued

| Hiding Pigment-free Basecoat Composition | Component | Grams |
|---|---|---|
| | POLYPHASE 663[9] | 1.1 |
| | ACTICIDE MBS[10] | 1.1 |
| | BA-5T Emulsion[11] | 621.0 |
| | NATROSOL PLUS 330 PA[12] | 3.2 |
| Acrylic | Water | 277.6 |
| | OROTAN 1124[1] | 0.4 |
| | ULTRANEX NP 100[2] | 1.5 |
| | Dimethyl ethanolamine | 3.0 |
| | FOAMASTER MO 2111[3] | 3.3 |
| | ACRYSOL RM-5000[13] | 11.5 |
| | OMYALENE SJ[5] | 35.1 |
| | MERGAL 395[6] | 1.1 |
| | HALTANOL[7] | 27.8 |
| | PRIMAL SCT-275[14] | 11.6 |
| | POLYPHASE 663[9] | 1.1 |
| | ACTICIDE MBS[10] | 1.1 |
| | AA3V Emulsion[15] | 681.4 |
| Styrene - acrylic | Water | 238.0 |
| | OROTAN 1124[1] | 0.4 |
| | ULTRANEX NP 100[2] | 2.0 |
| | Dimethyl ethanolamine | 3.9 |
| | FOAMASTER MO 2111[3] | 4.3 |
| | ACRYSOL RM-5000[13] | 11.3 |
| | OMYALENE SJ[5] | 35.1 |
| | MERGAL 395[6] | 1.0 |
| | HALTANOL[7] | 26.1 |
| | PRIMAL SCT-275[14] | 11.4 |
| | POLYPHASE 663[9] | 1.0 |
| | ACTICIDE MBS[10] | 1.0 |
| | SAX723 EMULSION[16] | 698.9 |

[1]Dispersant available from Dow Chemical Company (Midland, MI)
[2]Non-ionic surfactant and dispersing agent available from Oxiteno (Sao Paulo, Brazil)
[3]Defoamer available from BASF (Ludwigshafen, Germany)
[4]Rheology modifier available from Dow Chemical Company (Midland, MI)
[5]Calcium Carbonate available from OMYA (Oftringen, Switzerland)
[6]Biocide available from Troy Corporation (Florham Park, NJ)
[7]Ester alcohol available from Monument Chemical (Houston, TX)
[8]Rheology modifier emulsion available from AP Resinas S.A de CV (San Juan del Rio, Mexico)
[9]Fungicide and Algaecide available from Troy Corporation (Florham Park, NJ)
[10]Microbiocide available from Thor GmbH (Speyer, Germany)
[11]Vinyl-acrylic resin available from AP Resinas S.A de CV (San Juan del Rio, Mexico)
[12]Hydrophobically modified hydroxyethylcellulose (HMHEC) available from Ashland Inc. (Covington, KY)
[13]Rheology modifier available from Dow Chemical Company (Midland, MI)
[14]HEUR rheology modifier available from Dow Chemical Company (Midland, MI)
[15]Acrylic resin available from AP Resinas S.A de CV (San Juan del Rio, Mexico)
[16]Styrene - acrylic resin available from AP Resinas S.A de CV (San Juan del Rio, Mexico)

Example 2

Resin Slurry Composition

A resin slurry composition sample was prepared including the components shown in Table 2. RHOPLEX AC-264 LO, HALTANOL, Monoethylene glycol GI, TEGO FOAMEX 810, KATHON LX. MERGAL 395, and TROYSAN POLYPHASE AF-1 were added in a metal vessel and mixed at 60 RPM using a pitch blade turbine (PBT) of 2 inches in diameter. The blend was mixed until a homogeneous solution was obtained.

TABLE 2

| Component | Grams |
|---|---|
| RHOPLEX AC-264 LO[17] | 1006.4 |
| HALTANOL[7] | 36.5 |
| Monoethylene glycol GI | 10.6 |

TABLE 2-continued

| Component | Grams |
|---|---|
| TEGO FOAMEX 810[18] | 0.1 |
| KATHON LX[19] 1.5% | 0.8 |
| MERGAL 395[6] | 0.8 |
| TROYSAN POLYPHASE AF-1[20] | 0.8 |

[17]Emulsion polymer available from Dow Chemical Company (Midland, MI)
[18]Defoamer available from Evonik Industries (Essen, Germany)
[19]Microbicide available from Dow Chemical Company (Midland, MI)
[20]Fungicide available from Troy Corporation (Florham Park, NJ)

Example 3

Pigment Slurry Composition

A pigment slurry composition was prepared including titanium dioxide with a particle size of 0.4 micrometers, as a hiding pigment and a blend of bentonite and an associative HEUR rheology modifier as a rheology modifier.

Liquids components (water, glycol, wetting agent, dispersant, amine, defoamer) were added to a disperser and mixed at low RPM's. Pigment extenders and bentonite were then slowly added to the disperser. It was dispersed for 20 minutes at high RPM's. After that, water and additives were incorporated into the disperser. Finally, viscosity of the mixture was adjusted to specification by adding a HEUR rheology modifier. The components of the pigment slurry composition are shown in Table 3.

TABLE 3

| Component | Weight Percent |
|---|---|
| Bentonite[21] | 0.1 |
| HEUR[22] | 0.1 |
| TiO$_2$ | 70.0 |
| OROTAN 963[23] | 2.1 |
| ULTRANEX NP 100[2] | 0.2 |
| Dimethylethanolamine | 0.3 |
| FOAMASTER MO 211[3] | 0.3 |
| KATHON LX[19] 1.5% | 0.1 |
| MERGAL 395[6] | 0.1 |
| TROYSAN POLYPHASE AF-1[20] | 0.1 |
| Water | 22.6 |
| Monoethylene glycol | 4.0 |
| Total | 100.0 |

[21]Bentone DH available from Elementis Specialties (London, England)
[22]ACRYSOL RM 12W available from Dow Chemical Company (Midland, MI)
[23]Dispersant available from Dow Chemical Company (Midland, MI)

Example 4

Pigment Extender Slurry Composition

A pigment extender slurry composition was prepared including calcium carbonate with a particle size of 5 micrometers as a pigment extender and a blend of sepiolite and an associative HASE rheology modifier.

Liquids components (water, glycol, wetting agent, dispersant, amine, defoamer) were added to a disperser and mixed at low RPM's. Pigment extenders and sepiolite were then slowly added to the disperser, and it was dispersed for 20 minutes at high RPM's. After that, water and additives were incorporated into the disperser. Finally, viscosity of the mixture was adjusted to specification adding HASE rheology modifier. The components of the pigment extender slurry composition are shown in Table 4.

TABLE 4

| Component | Weight Percent |
|---|---|
| Sepiolite[2] | 0.2 |
| HASE[25] | 0.1 |
| CaCO$_3$ | 68 |
| OROTAN 963[23] | 0.6 |
| FOAMASTER MO 2111[3] | 0.3 |
| ULTRANEX NP 100[2] | 0.1 |
| Dimethylethanolamine | 0.4 |
| SURFACPOL 8040[26] | 0.2 |
| KATHON LX[19] 1.5% | 0.1 |
| MERGAL 395[6] | 0.1 |
| ACTICIDE MBS[27] | 0.2 |
| TROYSAN POLIPHASE AF-1[20] | 0.1 |
| Water | 25.6 |
| Monoethylene glycol | 4 |
| Total | 100.0 |

[24]SEPIOGEL F available from IMV Nevada (Amargosa Valley, NV)
[25]ACRYSOLTT-615 available from Dow Chemical Company (Midland, MI)
[26]Surfactant available from Grupo Polak (Mexico City, Mexico)
[27]Microbicide available from Thor GmbH (Speyer, Germany)

Example 5

Filler Slurry Composition

A filler slurry composition was prepared including the components provided in Table 5. Water, ethylene glycol, AF2540 Emulsion, TEGO FOAMEX, KATHON LX, MERGAL 395, and TROYSAN POLYPHASE AF-1 were added in a metal vessel and mixed at 60 RPM using a pitch blade turbine (PBT) of 2 inches in diameter. The blend was mixed until a homogeneous solution was obtained.

TABLE 5

| Component | Grams |
|---|---|
| Water | 810.0 |
| Ethylene glycol | 156.0 |
| AF2540 Emulsion[8] | 51.0 |
| TEGO FOAMEX 810[18] | 0.2 |
| KATHON LX[19] 1.5% | 0.8 |
| MERGAL 395[6] | 0.8 |
| TROYSAN POLYPHASE AF-1[20] | 0.8 |

Example 6

Coating Compositions

Vinyl-acrylic coating compositions of different colors and finishes were prepared by mixing the vinyl-acrylic hiding pigment-free basecoat composition prepared in Example 1; and/or the resin slurry composition prepared in Example 2; and/or the pigment slurry composition prepared in Example 3; and/or the extender pigment slurry composition prepared in Example 4; and/or the filler slurry composition prepared in Example 5; and/or a colorant. A summary of the components included in each vinyl-acrylic coating composition is provided in Table 6.

TABLE 6

| Finish | | Whites | Medium | Deep Milliliters | Accent | Intense |
|---|---|---|---|---|---|---|
| Flat | Basecoat (Ex. 1) | 650 | 650 | 650 | 650 | 650 |
| | Slurry A (Ex. 3) | 170.9 | 99 | 67 | 32 | 0 |
| | Slurry B (Ex. 2) | 0 | 0 | 10.8 | 0 | 0 |
| | Slurry C (Ex. 4) | 174.1 | 227.9 | 252.1 | 259.7 | 274.8 |
| | Slurry D (Ex. 5) | 0 | 13.1 | 0.1 | 18.3 | 5.2 |
| | Colorant | 5 | 10 | 20 | 40 | 70 |
| | Total Volume | 1000.0 | 1000.0 | 1000.0 | 1000.0 | 1000.0 |
| Eggshell | Basecoat (Ex. 1) | 650 | 650 | 650 | 650 | 650 |
| | Slurry A (Ex. 3) | 176.6 | 102.8 | 67.6 | 33.1 | 0 |
| | Slurry B (Ex. 2) | 91.5 | 103.2 | 109.6 | 112.2 | 110.5 |
| | Slurry C (Ex. 4) | 76.9 | 121.2 | 131.2 | 139.6 | 146.3 |
| | Slurry D (Ex. 5) | 0 | 12.8 | 21.6 | 25.1 | 23.2 |
| | Colorant | 5 | 10 | 20 | 40 | 70 |
| | Total Volume | 1000.0 | 1000.0 | 1000.0 | 1000.0 | 1000.0 |
| Satin | Basecoat (Ex. 1) | 650 | 650 | 650 | 650 | 650 |
| | Slurry A (Ex. 3) | 179.8 | 104.2 | 68 | 33.3 | 0 |
| | Slurry B (Ex. 2) | 142.3 | 154.9 | 159.3 | 163.9 | 167.2 |
| | Slurry C (Ex. 4) | 22.9 | 64.2 | 70.8 | 77.2 | 83.2 |
| | Slurry D (Ex. 5) | 0 | 16.7 | 31.9 | 35.6 | 29.6 |
| | Colorant | 5 | 10 | 20 | 40 | 70 |
| | Total Volume | 1000.0 | 1000.0 | 1000.0 | 1000.0 | 1000.0 |
| Semigloss | Basecoat (Ex. 1) | 650 | 650 | 650 | 650 | 650 |
| | Slurry A (Ex. 3) | 181.2 | 105.4 | 69.9 | 33.7 | 0 |
| | Slurry B (Ex. 2) | 163.8 | 185.3 | 202.8 | 202.2 | 209.3 |
| | Slurry C (Ex. 4) | 0 | 33 | 35.6 | 36.3 | 37.8 |
| | Slurry D (Ex. 5) | 0 | 16.3 | 21.7 | 37.8 | 32.9 |
| | Colorant | 5 | 10 | 20 | 40 | 70 |
| | Total Volume | 1000.0 | 1000.0 | 1000.0 | 1000.0 | 1000.0 |

Slurry A: Pigment slurry composition; Slurry B: Resin slurry composition; Slurry C: Extender pigment slurry composition; Slurry D: Filler slurry composition; Colorant: Red oxide.

Optical properties of white and intense colors from the vinyl-acrylic coating compositions were measured and they are shown in Table 7. Gloss was measured according to ASTM D523, and Color CIE Lab* was measured according to ASTM D2244.

TABLE 7

| Color | Finish | Gloss 20° | Gloss 60° | Gloss 85° | L* CIELAB | a* CIELAB | b* CIELAB |
|---|---|---|---|---|---|---|---|
| White | Flat | 0.80 | 2.20 | 8.90 | 76.17 | 18.86 | 13.6 |
| White | Eggshell | 1.40 | 11.50 | 30.90 | 76.64 | 18.8 | 13.82 |
| White | Satin | 1.90 | 21.10 | 62.30 | 76.92 | 18.58 | 13.74 |
| White | Semigloss | 3.80 | 35.30 | 80.90 | 76.82 | 18.61 | 13.75 |
| Intense | Flat | 0.40 | 2.60 | 4.40 | 41.36 | 29.09 | 22.73 |
| Intense | Eggshell | 1.70 | 14.30 | 26.00 | 40.1 | 31.71 | 26.34 |
| Intense | Satin | 4.80 | 28.80 | 49.80 | 38.62 | 33.71 | 29.53 |
| Intense | Semigloss | 13.80 | 49.60 | 71.70 | 37.02 | 35.83 | 33.83 |

These results demonstrate a coating system with the ability to configure vinyl acrylic coating compositions to achieve any desired color or finish by employing the same hiding pigment-free basecoat composition and the correct amount of slurries.

Example 7

Coating Compositions

Twenty acrylic coating compositions of different colors and finishes were prepared by mixing the acrylic hiding pigment-free basecoat composition prepared in Example 1; and/or the resin slurry composition prepared in Example 2, and/or the pigment slurry composition prepared in Example 3; and/or the extender pigment slurry composition prepared in Example 4; and/or the filler slurry composition prepared in Example 5; and/or a colorant. A summary of the components included in each acrylic coating composition is provided in Table 8.

TABLE 8

| Finish | | White | Medium | Deep Milliliters | Accent | Intense |
|---|---|---|---|---|---|---|
| Flat | Basecoat (Ex. 1) | 650 | 650 | 650 | 650 | 650 |
| | Slurry A (Ex. 3) | 170.9 | 128.7 | 84.9 | 41.2 | 0 |
| | Slurry B (Ex. 2) | 0 | 5 | 6.5 | 0.7 | 0 |
| | Slurry C (Ex. 4) | 174.1 | 205.5 | 231.8 | 251.9 | 274.9 |
| | Slurry D (Ex. 5) | 0 | 0.8 | 6.8 | 16.2 | 5.1 |
| | Colorant | 5 | 10 | 20 | 40 | 70 |
| | Total Volume | 1000.0 | 1000.0 | 1000.0 | 1000.0 | 1000.0 |
| Eggshell | Basecoat (Ex. 1) | 650 | 650 | 650 | 650 | 650 |
| | Slurry A (Ex. 3) | 175.1 | 131 | 85.8 | 42 | 0 |
| | Slurry B (Ex. 2) | 69.5 | 85.4 | 94.4 | 101.8 | 103.6 |
| | Slurry C (Ex. 4) | 99.7 | 113.5 | 124.9 | 135.6 | 143.9 |
| | Slurry D (Ex. 5) | 0.7 | 10.1 | 24.9 | 30.6 | 32.5 |
| | Colorant | 5 | 10 | 20 | 40 | 70 |
| | Total Volume | 1000.0 | 1000.0 | 1000.0 | 1000.0 | 1000.0 |
| Satin | Basecoat (Ex. 1) | 650 | 650 | 650 | 650 | 650 |
| | Slurry A (Ex. 3) | 178 | 134.4 | 87.8 | 43.1 | 0 |
| | Slurry B (Ex. 2) | 115.3 | 139.6 | 150.6 | 161.4 | 165.5 |

TABLE 8-continued

| Finish | | White | Medium | Deep Milliliters | Accent | Intense |
|---|---|---|---|---|---|---|
| | Slurry C (Ex. 4) | 51.1 | 61.3 | 69.2 | 76.8 | 82.9 |
| | Slurry D (Ex. 5) | 0.6 | 4.7 | 22.4 | 28.7 | 31.6 |
| | Colorant | 5 | 10 | 20 | 40 | 70 |
| | Total Volume | 1000.0 | 1000.0 | 1000.0 | 1000.0 | 1000.0 |
| Semigloss | Basecoat (Ex. 1) | 650 | 650 | 650 | 650 | 650 |

TABLE 8-continued

| Finish | | White | Medium | Deep Milliliters | Accent | Intense |
|---|---|---|---|---|---|---|
| | Slurry A (Ex. 3) | 181.2 | 135.1 | 90.3 | 44 | 0 |
| | Slurry B (Ex. 2) | 163.8 | 183.3 | 205.3 | 210.3 | 215.8 |
| | Slurry C (Ex. 4) | 0 | 7.9 | 19.2 | 29.1 | 38.6 |
| | Slurry D (Ex. 5) | 0 | 13.7 | 15.2 | 26.6 | 25.6 |
| | Colorant | 5 | 10 | 20 | 40 | 70 |
| | Total Volume | 1000.0 | 1000.0 | 1000.0 | 1000.0 | 1000.0 |

Slurry A: Pigment slurry composition; Slurry B: Resin slurry composition; Slurry C: Extender pigment slurry composition; Slurry D: Filler slurry composition; Colorant: Red oxide.

Optical properties of white and intense colors from the acrylic coating compositions were measured and are shown in Table 9. Gloss was measured according to ASTM D523, and Color CIE Lab* was measured according to ASTM D32244.

TABLE 9

| Color | Finish | Gloss 20° | Gloss 60° | Gloss 85° | L* CIELAB | a* CIELAB | b* CIELAB |
|---|---|---|---|---|---|---|---|
| White | Flat | 0.9 | 4.1 | 10.0 | 76.68 | 18.70 | 13.46 |
| White | Eggshell | 1.5 | 11.6 | 30.0 | 77.14 | 18.48 | 13.47 |
| White | Satin | 3.0 | 22.9 | 53.4 | 76.94 | 18.62 | 17.74 |
| White | Semigloss | 8.5 | 45.1 | 84.4 | 77.14 | 18.42 | 13.73 |
| Intense | Flat | 0.4 | 3.2 | 4.9 | 41.18 | 30.57 | 24.52 |
| Intense | Eggshell | 1.8 | 14.2 | 28.8 | 40.48 | 32.66 | 27.55 |
| Intense | Satin | 5.3 | 29.0 | 53.8 | 39.00 | 34.55 | 30.97 |
| Intense | Semigloss | 13.5 | 47.9 | 75.3 | 37.36 | 35.94 | 33.58 |

These results demonstrate a coating system with the ability to configure acrylic coating compositions to achieve any desired color or finish by employing the same hiding pigment-free basecoat composition and the correct amount of slurries.

Example 8

Coating Compositions

Styrene-acrylic coating compositions of different colors and finishes were prepared by mixing the styrene-acrylic hiding pigment-free basecoat composition prepared in Example 1, and/or the resin slurry composition prepared in Example 2; and/or the pigment slurry composition prepared in Example 3; and/or the extender pigment slurry composition prepared in Example 4; and/or the filler slurry composition prepared in Example 5; and/or a colorant. A summary of the components included in each styrene-acrylic coating composition is provided in Table 10.

TABLE 10

| Finish | | White | Medium | Deep Milliliters | Accent | Intense |
|---|---|---|---|---|---|---|
| Flat | Basecoat (Ex. 1) | 650 | 650 | 650 | 650 | 650 |
| | Slurry A (Ex. 3) | 170.9 | 127.2 | 83.7 | 41.1 | 0 |
| | Slurry B (Ex. 2) | 0 | 0.9 | 1.5 | 0 | 0 |
| | Slurry C (Ex. 4) | 174.1 | 202.9 | 228.3 | 251.4 | 275 |
| | Slurry D (Ex. 5) | 0 | 9 | 16.5 | 17.5 | 5 |
| | Colorant | 5 | 10 | 20 | 40 | 70 |
| | Total Volume | 1000 | 1000 | 1000 | 1000 | 1000 |
| Eggshell | Basecoat (Ex. 1) | 650 | 650 | 650 | 650 | 650 |
| | Slurry A (Ex. 3) | 175.3 | 130.2 | 86.1 | 42.4 | 0 |
| | Slurry B (Ex. 2) | 78.9 | 89.6 | 100.8 | 108.2 | 108.2 |
| | Slurry C (Ex. 4) | 87.9 | 103.8 | 119.6 | 133.9 | 145.2 |
| | Slurry D | 2.9 | 16.4 | 23.5 | 25.5 | 26.6 |
| | Colorant | 5 | 10 | 20 | 40 | 70 |
| | Total Volume | 1000 | 1000 | 1000 | 1000 | 1000 |
| Satin | Basecoat (Ex. 1) | 650 | 650 | 650 | 650 | 650 |
| | Slurry A (Ex. 3) | 178.2 | 134.4 | 87.8 | 43.3 | 0 |
| | Slurry B (Ex. 2) | 126.7 | 147.7 | 156.2 | 166.8 | 169.1 |
| | Slurry C (Ex. 4) | 36.9 | 50.5 | 62.2 | 73.9 | 83.6 |
| | Slurry D (Ex. 5) | 3.2 | 7.5 | 23.8 | 26 | 27.3 |
| | Colorant | 5 | 10 | 20 | 40 | 70 |
| | Total Volume | 1000 | 1000 | 1000 | 1000 | 1000 |
| Semigloss | Basecoat (Ex. 1) | 650 | 650 | 650 | 650 | 650 |
| | Slurry A (Ex. 3) | 181.2 | 134.1 | 88.8 | 43.4 | 0 |
| | Slurry B (Ex. 2) | 163.8 | 179.4 | 195.8 | 203.4 | 211 |
| | Slurry C (Ex. 4) | 0 | 7.7 | 18.6 | 28.5 | 38.1 |
| | Slurry D (Ex. 5) | 0 | 18.8 | 26.8 | 34.7 | 30.9 |
| | Colorant | 5 | 10 | 20 | 40 | 70 |
| | Total Volume | 1000 | 1000 | 1000 | 1000 | 1000 |

Slurry A: Pigment slurry composition; Slurry B: Resin slurry composition; Slurry C: Extender pigment slurry composition; Slurry D: Filler slurry composition; Colorant: Red oxide.

Optical properties of white and intense colors from the styrene-acrylic coating compositions were measured and they are shown in Table 11. Gloss was measured according to ASTM D523, and Color CIE Lab* was measured according to ASTM D2244.

TABLE 11

| Color | Finish | Gloss 20° | Gloss 60° | Gloss 85° | L* CIELAB | a* CIELAB | b* CIELAB |
|---|---|---|---|---|---|---|---|
| White | Flat | 0.8 | 3.2 | 8.0 | 75.68 | 19.17 | 13.41 |
| White | Eggshell | 1.3 | 10.4 | 30.1 | 76.09 | 19.16 | 14.02 |
| White | Satin | 2.5 | 22.2 | 57.4 | 76.61 | 18.79 | 13.96 |
| White | Semigloss | 5.9 | 38.7 | 82.5 | 76.22 | 19.11 | 14.41 |
| Intense | Flat | 0.3 | 2.6 | 3.9 | 40.96 | 30 | 23.78 |
| Intense | Eggshell | 1.4 | 12.1 | 23.5 | 40.45 | 32.01 | 26.62 |
| Intense | Satin | 4.4 | 25.9 | 49.3 | 39.91 | 33.87 | 29.77 |
| Intense | Semigloss | 11.0 | 43.6 | 71.0 | 37.35 | 35.33 | 32.16 |

These results demonstrate a coating system with the ability to configure styrene acrylic coating compositions to achieve any desired color or finish by employing the same hiding pigment-free basecoat composition and the correct amount of slurries.

Example 9

Coating Compositions

Vinyl-acrylic coating compositions of different colors and finishes were prepared by mixing the vinyl-acrylic hiding pigment-free basecoat composition prepared in Example 1; and/or the resin slurry composition prepared in Example 2; and/or Kronos 4311, a titanium dioxide slurry available from Kronos Worldwide, Inc. (Dallas, TX); and/or Omyaflow 50-SJ 72%, a calcium carbonate slurry available from Omya México SA de CV (Naucalpan, Estado de México), and/or the filler slurry composition prepared in Example 5; and/or a colorant. A summary of the components included in each vinyl-acrylic coating composition is provided in Table 12.

TABLE 12

| Finish | | Color | | | | |
|---|---|---|---|---|---|---|
| | | Whites | Medium | Deep | Accent | Intense |
| Flat | Basecoat (Ex. 1) | 650 | 650 | 650 | 650 | 650 |
| | Slurry E | 170.93 | 98.96 | 66.96 | 31.98 | 0 |
| | Slurry B (Ex. 2) | 0 | 0 | 10.75 | 0 | 0 |
| | Slurry G | 174.07 | 227.86 | 252.09 | 259.65 | 274.83 |
| | Slurry D (Ex. 5) | 0 | 13.18 | 0.2 | 18.37 | 5.17 |
| | Colorant | 5 | 10 | 20 | 40 | 70 |
| | Total Volume | 1000 | 1000 | 1000 | 1000 | 1000 |
| Eggshell | Basecoat (Ex. 1) | 650 | 650 | 650 | 650 | 650 |
| | Slurry E | 176.64 | 102.81 | 67.63 | 33.1 | 0 |
| | Slurry B (Ex. 2) | 91.5 | 103.15 | 109.63 | 112.17 | 110.5 |
| | Slurry G | 67.49 | 121.16 | 131.17 | 139.63 | 146.27 |
| | Slurry D (Ex. 5) | 9.36 | 12.88 | 21.57 | 25.09 | 23.24 |
| | Colorant | 5 | 10 | 20 | 40 | 70 |
| | Total Volume | 1000 | 1000 | 1000 | 1000 | 1000 |
| Satin | Basecoat (Ex. 1) | 650 | 650 | 650 | 650 | 650 |
| | Slurry E | 179.81 | 104.24 | 68 | 33.31 | 0 |
| | Slurry B (Ex. 2) | 142.32 | 154.87 | 159.3 | 163.91 | 167.18 |
| | Slurry G | 22.87 | 64.15 | 70.79 | 77.21 | 83.15 |
| | Slurry D (Ex. 5) | 0 | 16.74 | 31.91 | 35.56 | 29.67 |
| | Colorant | 5 | 10 | 20 | 40 | 70 |
| | Total Volume | 1000 | 1000 | 1000 | 1000 | 1000 |
| Semi-gloss | Basecoat (Ex. 1) | 650 | 650 | 650 | 650 | 650 |
| | Slurry E | 181.15 | 105.42 | 69.93 | 33.7 | 0 |
| | Slurry B (Ex. 2) | 163.85 | 185.33 | 202.76 | 202.24 | 209.33 |
| | Slurry G | 0 | 32.96 | 35.55 | 36.34 | 37.84 |
| | Slurry D (Ex. 5) | 0 | 16.29 | 21.76 | 37.72 | 32.83 |
| | Colorant | 5 | 10 | 20 | 40 | 70 |
| | Total Volume | 1000 | 1000 | 1000 | 1000 | 1000 |

Slurry E: Kronos 4311; Slurry B: Resin slurry composition; Slurry G: Omyaflow 50-SJ 72%; Slurry D: Filler slurry composition; Colorant: Red oxide.

Optical properties of white and intense colors from the vinyl-acrylic coating compositions were measured and they are shown in Table 13. Gloss was measured according to ASTM D523, and Color CIE Lab* was measured according to ASTM D2244.

TABLE 13

| Color | Finish | Gloss 20° | Gloss 60° | Gloss 85° | L* CIELAB | a* CIELAB | b* CIELAB |
|---|---|---|---|---|---|---|---|
| White | Flat | 0.8 | 2.2 | 5.9 | 76.01 | 18.97 | 13.4 |
| White | Eggshell | 1.5 | 10.4 | 25.6 | 76.53 | 18.86 | 14.14 |
| White | Satin | 2.4 | 23.9 | 61.7 | 77.59 | 18.39 | 13.71 |
| White | Semigloss | 4.6 | 37.6 | 84.9 | 77.57 | 18.44 | 13.75 |
| Intense | Flat | 0.3 | 2.1 | 3.5 | 41.12 | 28.7 | 21.92 |
| Intense | Eggshell | 1.3 | 11 | 17.5 | 41.28 | 29.87 | 23.41 |
| Intense | Satin | 3.4 | 23.7 | 39.6 | 41.08 | 30.7 | 24.31 |
| Intense | Semigloss | 9.2 | 41 | 65.5 | 41.24 | 31.16 | 24.83 |

These results demonstrate a coating system with the ability to configure vinyl acrylic coating compositions to achieve any desired color or finish by employing the same hiding pigment-free basecoat composition and the correct amount of slurries.

Example 10

Coating Compositions

Twenty acrylic coating compositions of different colors and finishes were prepared by mixing the acrylic hiding pigment-free basecoat composition prepared in Example 1; and/or the resin slurry composition prepared in Example 2; and/or Kronos 4311, a titanium dioxide slurry available from Kronos Worldwide, Inc. (Dallas, TX), and/or Omyaflow 50-SJ 72%, a calcium carbonate slurry available from Omya México SA de CV (Naucalpan, Estado de México); and/or the filler slurry composition prepared in Example 5; and/or a colorant. A summary of the components included in each acrylic coating composition is provided in Table 14.

TABLE 14

| Finish | | Color | | | | |
|---|---|---|---|---|---|---|
| | | White | Medium | Deep | Accent | Intense |
| Flat | Basecoat (Ex. 1) | 650 | 650 | 650 | 650 | 650 |
| | Slurry E | 170.93 | 128.65 | 84.9 | 41.16 | 0 |
| | Slurry B (Ex. 2) | 0 | 4.98 | 6.51 | 0.65 | 0 |
| | Slurry G | 174.07 | 205.46 | 231.77 | 251.86 | 274.85 |
| | Slurry D (Ex. 5) | 0 | 0.91 | 6.82 | 16.33 | 5.15 |
| | Colorant | 5 | 10 | 20 | 40 | 70 |
| | Total Volume | 1000 | 1000 | 1000 | 1000 | 1000 |
| Eggshell | Basecoat (Ex. 1) | 650 | 650 | 650 | 650 | 650 |
| | Slurry E | 175.12 | 130.97 | 85.76 | 42.02 | 0 |
| | Slurry B (Ex. 2) | 69.48 | 85.36 | 94.36 | 101.83 | 103.64 |
| | Slurry G | 99.72 | 113.47 | 124.94 | 135.59 | 143.89 |
| | Slurry D (Ex. 5) | 0.67 | 10.19 | 24.94 | 30.56 | 32.47 |
| | Colorant | 5 | 10 | 20 | 40 | 70 |
| | Total Volume | 1000 | 1000 | 1000 | 1000 | 1000 |
| Satin | Basecoat (Ex. 1) | 650 | 650 | 650 | 650 | 650 |
| | Slurry E | 178 | 134.4 | 87.82 | 43.07 | 0 |
| | Slurry B (Ex. 2) | 115.29 | 139.59 | 150.6 | 161.37 | 165.47 |
| | Slurry G | 51.13 | 61.3 | 69.2 | 76.83 | 82.94 |
| | Slurry D (Ex. 5) | 0.58 | 4.72 | 22.38 | 28.72 | 31.59 |
| | Colorant | 5 | 10 | 20 | 40 | 70 |
| | Total Volume | 1000 | 1000 | 1000 | 1000 | 1000 |
| Semi-gloss | Basecoat (Ex. 1) | 650 | 650 | 650 | 650 | 650 |
| | Slurry E | 181.15 | 135.05 | 90.33 | 43.96 | 0 |
| | Slurry B (Ex. 2) | 163.85 | 183.34 | 205.31 | 210.26 | 215.8 |
| | Slurry G | 0 | 7.91 | 19.21 | 29.12 | 38.6 |
| | Slurry D (Ex. 5) | 0 | 13.7 | 15.15 | 26.65 | 25.6 |
| | Colorant | 5 | 10 | 20 | 40 | 70 |
| | Total Volume | 1000 | 1000 | 1000 | 1000 | 1000 |

Slurry E: Kronos 4311; Slurry B: Resin slurry composition; Slurry G: Omyaflow 50-SJ 72%; Slurry D: Filler slurry composition; Colorant: Red oxide.

Optical properties of white and intense colors from the vinyl-acrylic coating compositions were measured and are shown in Table 15. Gloss was measured according to ASTM D523 and Color CIE Lab* was measured according to ASTM D2244.

TABLE 15

| Color | Finish | Gloss 20° | Gloss 60° | Gloss 85° | L* CIELAB | a* CIELAB | b* CIELAB |
|---|---|---|---|---|---|---|---|
| White | Flat | 0.8 | 3.3 | 7.8 | 76.44 | 18.81 | 13.6 |
| White | Eggshell | 1.3 | 10.2 | 26.2 | 76.93 | 18.66 | 13.75 |
| White | Satin | 2.1 | 21 | 48.9 | 76.99 | 18.62 | 13.83 |
| White | Semigloss | 11 | 49.6 | 87.9 | 77.69 | 18.29 | 13.96 |
| Intense | Flat | 0.4 | 2.6 | 3.5 | 41.5 | 30.34 | 24.19 |
| Intense | Eggshell | 1.6 | 12.7 | 21.2 | 41.39 | 31.32 | 24.93 |
| Intense | Satin | 4.2 | 24.6 | 41.4 | 42.01 | 31.57 | 25.55 |
| Intense | Semigloss | 12.7 | 45.1 | 68.8 | 41.52 | 31.82 | 25.29 |

These results demonstrate a coating system with the ability to configure acrylic coating compositions to achieve any desired color or finish by employing the same hiding pigment-free basecoat composition and the correct amount of slurries.

Example 11

Coating Compositions

Styrene-acrylic coating compositions of different colors and finishes were prepared by mixing the styrene-acrylic hiding pigment-free basecoat composition prepared in Example 1; and/or the resin slurry composition prepared in Example 2; and/or Kronos 4311, a titanium dioxide slurry available from Kronos Worldwide, Inc. (Dallas, TX); and/or Omyaflow 50-SJ 72%, a calcium carbonate slurry available from Omya México SA de CV (Naucalpan, Estado de México); and/or the filler slurry composition prepared in Example 5; and/or a colorant. A summary of the components included in each styrene-acrylic coating composition is provided in Table 16.

TABLE 16

| Finish | | Color | | | | |
|---|---|---|---|---|---|---|
| | | White | Medium | Deep | Accent | Intense |
| Flat | Basecoat (Ex. 1) | 650 | 650 | 650 | 650 | 650 |
| | Slurry E | 170.93 | 127.16 | 83.71 | 41.09 | 0 |
| | Slurry B (Ex. 2) | 0 | 0.86 | 1.51 | 0 | 0 |

TABLE 16-continued

| Finish | | Color | | | | |
|---|---|---|---|---|---|---|
| | | White | Medium | Deep | Accent | Intense |
| | Slurry G | 174.07 | 202.88 | 228.3 | 251.44 | 274.97 |
| | Slurry D (Ex. 5) | 0 | 9.1 | 16.48 | 17.47 | 5.03 |
| | Colorant | 5 | 10 | 20 | 40 | 70 |
| | Total Volume | 1000 | 1000 | 1000 | 1000 | 1000 |
| Eggshell | Basecoat (Ex. 1) | 650 | 650 | 650 | 650 | 650 |
| | Slurry E | 175.25 | 130.19 | 86.11 | 42.39 | 0 |
| | Slurry B (Ex. 2) | 78.94 | 89.6 | 100.79 | 108.22 | 108.19 |
| | Slurry G | 87.93 | 103.78 | 119.55 | 133.88 | 145.18 |
| | Slurry D (Ex. 5) | 2.87 | 16.43 | 23.55 | 25.51 | 26.63 |
| | Colorant | 5 | 10 | 20 | 40 | 70 |
| | Total Volume | 1000 | 1000 | 1000 | 1000 | 1000 |
| Satin | Basecoat (Ex. 1) | 650 | 650 | 650 | 650 | 650 |
| | Slurry E | 178.16 | 134.35 | 87.84 | 43.3 | 0 |
| | Slurry B (Ex. 2) | 126.74 | 147.72 | 156.17 | 166.78 | 169.07 |
| | Slurry G | 36.86 | 50.46 | 62.16 | 73.86 | 83.65 |
| | Slurry D (Ex. 5) | 3.24 | 7.48 | 23.83 | 26.06 | 27.28 |
| | Colorant | 5 | 10 | 20 | 40 | 70 |
| | Total Volume | 1000 | 1000 | 1000 | 1000 | 1000 |
| Semi-gloss | Basecoat (Ex. 1) | 650 | 650 | 650 | 650 | 650 |
| | Slurry E | 181.15 | 134.05 | 88.77 | 43.43 | 0 |
| | Slurry B (Ex. 2) | 163.85 | 179.41 | 195.76 | 203.43 | 211 |
| | Slurry G | 0 | 7.71 | 18.56 | 28.53 | 38.11 |
| | Slurry D (Ex. 5) | 0 | 18.84 | 26.92 | 34.61 | 30.89 |
| | Colorant | 5 | 10 | 20 | 40 | 70 |
| | Total Volume | 1000 | 1000 | 1000 | 1000 | 1000 |

Slurry E: Kronos 4311; Slurry B: Resin slurry composition; Slurry G: Omyaflow 50-SJ 72%; Slurry D: Filler slurry composition; Colorant: Red oxide.

Optical properties of white and intense colors from the styrene-acrylic coating compositions were measured and they are shown in Table 17. Gloss was measured according to ASTM D523, and Color CIE Lab* was measured according to ASTM D2244.

TABLE 17

| Color | Finish | Gloss 20° | Gloss 60° | Gloss 85° | L* CIELAB | a* CIELAB | b* CIELAB |
|---|---|---|---|---|---|---|---|
| White | Flat | 0.8 | 3.2 | 8 | 75.68 | 19.17 | 13.41 |
| White | Eggshell | 1.3 | 10.4 | 30.1 | 76.09 | 19.16 | 14.02 |
| White | Satin | 2.5 | 22.2 | 57.4 | 76.61 | 18.79 | 13.96 |
| White | Semigloss | 5.9 | 38.7 | 82.5 | 76.22 | 19.11 | 14.41 |
| Intense | Flat | 0.3 | 2.6 | 3.9 | 40.96 | 30 | 23.78 |
| Intense | Eggshell | 1.4 | 12.1 | 23.5 | 40.45 | 32.01 | 26.62 |
| Intense | Satin | 4.4 | 25.9 | 49.3 | 39.91 | 33.87 | 29.77 |
| Intense | Semigloss | 11 | 43.6 | 71 | 37.35 | 35.33 | 32.16 |

These results demonstrate a coating system with the ability to configure styrene acrylic coating compositions to achieve any desired color or finish by employing the same hiding pigment-free basecoat composition and the correct amount of slurries.

Example 12

Hiding Pigment-Free Basecoat Composition

Three hiding pigment-free basecoat compositions were prepared including the components shown in Table 18.

Flat and Satin hiding pigment-free basecoat compositions were prepared adding water, TERGITOL NP-9, OROTAN 1124. AMINOMETHYL PROPANOL, and FOAMASTER MO 2111 to a disperser and mixed at 350 RPM using a Cowles blade of 2 inches in diameter; the blends were mixed until homogeneous solutions were obtained. After that, OMYACARB 10 and CELATOM MW-27 (for flat hiding pigment-free basecoat compositions) or OMYACARB 1 and OMYACARB 10 (for satin hiding pigment-free basecoat compositions) were incorporated into the disperser and it was stirred for 15 minutes at 750 RPM. After mixing, the speed of the blade was reduced to 350 RPM. At such speed, the rest of the components listed in Table 18 for flat or satin hiding pigment-free basecoat compositions were slowly added to the disperser. It was mixed for 30 minutes to obtain the final basecoat composition.

Gloss hiding pigment-free basecoat compositions were prepared adding all the components listed in Table 18 for gloss hiding pigment-free basecoat compositions to a disperser and mixed at 350 RPM using a Cowles blade of 2 inches in diameter; the blends were mixed until homogeneous solutions were obtained.

TABLE 18

| Hiding Pigment-free Basecoat Composition | Component | Grams |
|---|---|---|
| Flat | Water | 349.72 |
| | TERGITOL NP-9[28] | 3.90 |
| | OROTAN 1124[1] | 5.38 |
| | AMINOMETHYL PROPANOL (AMP 95%) | 3.17 |

TABLE 18-continued

| Hiding Pigment-free Basecoat Composition | Component | Grams |
|---|---|---|
| | FOAMASTER MO 2111 NC[29] | 6.88 |
| | OMYACARB 10[30] | 171.00 |
| | CELATOM MW-27[31] | 127.84 |
| | KATHON LX 1.5%[19] | 1.39 |
| | TEXANOL | 25.71 |
| | ROVACE 9900[32] | 438.00 |
| | ACRYSOL RM-2020[33] | 15.47 |
| | PRIMAL TT-615[34] | 22.10 |
| | TROYSAN POLIPHASE AF-1[20] | 2.81 |
| Satin | WATER | 473.79 |
| | TERGITOL NP-9[28] | 3.72 |
| | OROTAN 1124[1] | 2.74 |
| | AMP 95% | 2.50 |
| | FOAMASTER MO 2111 NC[29] | 3.12 |
| | OMYACARB 1[35] | 83.03 |
| | OMYACARB 10[30] | 95.19 |
| | KATHON LX 1.5%[19] | 0.78 |
| | TEXANOL | 9.80 |
| | ROVACE 9900[32] | 416.76 |
| | PRIMAL TT-935[36] | 12.35 |
| | ACRYSOL RM-2020[33] | 37.08 |
| | TROYSAN POLIPHASE AF-1[20] | 2.15 |
| Gloss | ETHYLENE GLYCOL | 14.77 |
| | TEGO FOAMEX 810[13] | 2.69 |
| | AMP 95% | 3.18 |
| | KATHON LX 1.5%[19] | 2.31 |
| | TEXANOL | 23.87 |
| | RAYCRYL 1500[37] | 893.66 |
| | WATER | 88.08 |
| | SODIUM NITRITE | 2.33 |
| | ACRYSOL RM-8W[38] | 1.14 |
| | ACRYSOL RM-2020[39] | 4.17 |
| | TROYSAN POLIPHASE AF-1[20] | 1.53 |

[28]Surfactant available from Dow Chemical Company (Midland, MI)
[29]Defoamer available from BASF (Ludwigshafen, Germany)
[30]Calcium Carbonate available from OMYA (Oftringen, Switzerland)
[31]Filler available from EP Minerals (Reno, NV)
[32]Vinyl Acrylic Binder available from Dow Chemical Company (Midland, MI)
[33]Non-ionic urethane rheology modifier available from Dow Chemical Company (Midland, MI)
[34]Thickener available from Dow Chemical Company (Midland, MI)
[35]Calcium Carbonate available from OMYA (Oftringen, Switzerland)
[36]Rheology modifier available from Dow Chemical Company (Midland, MI)
[37]Acrylic binder available from Specialty Polymers, Inc. (Woodburn, OR)
[38]Nonionic urethane rheology modifier available from Dow Chemical Company (Midland, MI)
[39]Rheology modifier available from Dow Chemical Company (Midland, MI)

Example 13

Coating Compositions

Five flat coating compositions were prepared by mixing the flat hiding pigment-free basecoat composition prepared in Example 12; and/or the pigment slurry composition prepared in Example 3; and/or the extender pigment slurry composition prepared in Example 4; and/or the filler slurry composition prepared in Example 5; and/or a colorant. A summary of the components included in each flat coating composition is provided in Table 19.

TABLE 19

| Finish | | Color | | | | |
|---|---|---|---|---|---|---|
| | | White | Medium | Deep | Accent | Intense |
| Flat | Basecoat (Ex. 12) | 796 | 796 | 796 | 796 | 796 |
| | Slurry A (Ex. 3) | 199 | 124 | 74 | 31 | 0 |
| | Slurry C (Ex. 4) | 0 | 19 | 32 | 42 | 55 |
| | Slurry D (Ex. 5) | 0 | 51 | 79 | 90 | 79 |
| | Colorant | 5 | 10 | 20 | 40 | 70 |
| | Total Volume | 1000 | 1000 | 1000 | 1000 | 1000 |

Slurry A: Pigment slurry composition; Slurry C: Extender pigment slurry composition; Slurry D: Filler slurry composition; Colorant: Red oxide.

Optical properties of white, deep and intense colors from the flat coating compositions were measured and they are shown in Table 20. Gloss was measured according to ASTM D523, and Color CIE Lab* was measured according to ASTM D2244.

TABLE 20

| Color | Gloss 20° | Gloss 60° | Gloss 85° | L* CIELAB | a* CIELAB | b* CIELAB |
|---|---|---|---|---|---|---|
| White | 0.7 | 1 | 0.5 | 74.78 | 19.82 | 14.13 |
| Deep | 0.4 | 0.6 | 0.5 | 54.17 | 30.72 | 23 |
| Intense | 0.2 | 0.4 | 0.5 | 36.16 | 32.43 | 27.18 |

In these results can be seen that is possible to modulate the color of the coating composition by changing the blend ratio of the components described above and at the same time keep constant the finish of the coating composition.

Example 14

Five satin coating compositions were prepared by mixing the satin hiding pigment-free basecoat composition prepared in Example 12; and/or the pigment slurry composition prepared in Example 3; and/or the extender pigment slurry composition prepared in Example 4; and/or the filler slurry composition prepared in Example 5; and/or a colorant. A summary of the components included in each satin coating composition is provided in Table 21.

TABLE 21

| Finish | | Color | | | | |
|---|---|---|---|---|---|---|
| | | White | Medium | Deep | Accent | Intense |
| Satin | Basecoat (Ex. 12) | 790 | 790 | 790 | 790 | 790 |
| | Slurry A (Ex. 3) | 155 | 120 | 108 | 38 | 0 |
| | Slurry C (Ex. 4) | 21 | 27 | 40 | 50 | 72 |
| | Slurry D (Ex. 5) | 29 | 53 | 42 | 82 | 68 |
| | Colorant | 5 | 10 | 20 | 40 | 70 |
| | Total Volume | 1000 | 1000 | 1000 | 1000 | 1000 |

Slurry A: Pigment slurry composition; Slurry C: Extender pigment slurry composition; Slurry D: Filler slurry composition; Colorant: Red oxide.

Optical properties of white, deep and intense colors from the satin coating compositions were measured and they are shown in Table 22. Gloss was measured according to ASTM D523, and Color CIE Lab* was measured according to ASTM D2244.

TABLE 22

| Color | Gloss 20° | Gloss 60° | Gloss 85° | L* CIELAB | a* CIELAB | b* CIELAB |
|---|---|---|---|---|---|---|
| White | 4.7 | 32.7 | 63.1 | 77.26 | 18.13 | 13.06 |
| Deep | 2.5 | 23.1 | 50.8 | 55.39 | 29.93 | 21.93 |
| Intense | 4.3 | 25.3 | 39.2 | 41.84 | 31.07 | 25.15 |

In these results can be seen that is possible to modulate the color of the coating composition by changing the blend ratio of the components described above and at the same time keep constant the finish of the coating composition Example 15

Five gloss coating compositions were prepared by mixing the gloss hiding pigment-free basecoat composition prepared in Example 12; and/or the pigment slurry composition prepared in Example 3; and/or the filler slurry composition prepared in Example 5; and/or a colorant. A summary of the components included in each gloss coating composition is provided in Table 23.

TABLE 23

| | | Color | | | |
|---|---|---|---|---|---|
| Finish | White | Medium | Deep | Accent | Intense |
| Gloss Basecoat (Ex. 12) | 865 | 865 | 865 | 865 | 865 |
| Slurry A (Ex. 3) | 115 | 88 | 67 | 20 | 0 |
| Slurry D (Ex. 5) | 15 | 37 | 48 | 75 | 65 |
| Colorant | 5 | 10 | 20 | 40 | 70 |
| Total Volume | 1000 | 1000 | 1000 | 1000 | 1000 |

Slurry A: Pigment slurry composition; Slurry C: Extender pigment slurry composition; Slurry D: Filler slurry composition; Colorant: Red oxide.

Optical properties of white, deep and intense colors from the semi-gloss coating compositions were measured and they are shown in Table 24. Gloss was measured according to ASTM D523, and Color CIE Lab* was measured according to ASTM D2244.

TABLE 24

| Color | Gloss 20° | Gloss 60° | Gloss 85° | L* CIELAB | a* CIELAB | b* CIELAB |
|---|---|---|---|---|---|---|
| White | 36.5 | 71.5 | 91.2 | 77.58 | 17.08 | 10.5 |
| Deep | 48.9 | 76.8 | 94.1 | 61.23 | 28.01 | 19.45 |
| Intense | 58.4 | 78.9 | 95.9 | 42.92 | 32.4 | 27.18 |

In these results can be seen that is possible to modulate the color of the coating composition by changing the blend ratio of the components described above and at the same time keep constant the finish of the coating composition.

Whereas particular embodiments of this invention have been described above for purposes of illustration, it will be evident to those skilled in the art that numerous variations of the details of the present invention may be made without departing from the invention as defined in the appended claims.

The invention claimed is:

1. A coating blending system, comprising as separate components:
   (a) a hiding pigment-free basecoat composition, comprising:
      (i) a basecoat resin; and
      (ii) a liquid carrier; and
   (b) and/or (c) as follows:
   (b) a pigment slurry composition, comprising:
      (iii) a hiding pigment;
      (iv) a rheology modifier; and
      (v) a liquid carrier;
   (c) an extender pigment slurry composition, comprising:
      (vi) an extender pigment;
      (vii) a rheology modifier; and
      (viii) a liquid carrier,
   wherein the rheology modifier (iv) and/or (vii) comprises an organic rheology modifier and an inorganic rheology modifier,
   wherein the components are maintained in separate containers, each of which is in fluid communication with each other and/or a mixing container.

2. The coating blending system of claim 1, further comprising as a separate component, (d) a resin slurry composition, comprising:
   (ix) a resin; and
   (x) a liquid carrier, wherein component d is housed in a separate container in fluid communication with the mixing container.

3. The coating blending system of claim 2, wherein, when mixed, the resin (ix) is compatible with the basecoat resin (i).

4. The coating blending system of claim 1, wherein the pigment slurry composition (b) and/or the extender pigment slurry composition (c) are resin-free.

5. The coating blending system of claim 1, wherein the rheology modifier (iv) and/or (vii) comprises a hydrophobically modified alkali swellable emulsion (HASE) rheology modifier.

6. The coating blending system of claim 1, further comprising as a separate component, (e) a colorant, wherein component e is housed in a separate container in fluid communication with the mixing container.

7. The coating blending system of claim 1, further comprising as a separate component, (f) a filler slurry composition, comprising a liquid carrier, a rheology modifier, and/or an extender pigment.

8. The coating blending system of claim 1, wherein each of the separate components are stored in a separate container in a dispensing device.

9. A method of using the coating blending system of claim 1 for preparing a coating composition, comprising mixing the hiding pigment-free basecoat composition (a) and the pigment slurry composition (b) and/or extender pigment slurry composition (c) together in the mixing container to form the coating composition.

10. The method of claim 9, wherein the coating composition further comprises (d) a resin slurry composition, comprising:
    (ix) a resin; and
    (x) a liquid carrier.

11. The method of claim 9, wherein the coating compositions further comprise (e) a colorant.

12. The method of claim 9, wherein the coating composition further comprises (f) a filler slurry composition, comprising a liquid carrier, a rheology modifier, and/or an extender pigment.

13. The method of claim 9, wherein the hiding pigment-free basecoat composition (a) is mixed in the mixing container in an amount from 40 to 95 vol. %, based on the total volume of the coating composition.

14. The method of claim 9, wherein the pigment slurry composition (b), when used, is mixed in the mixing container in an amount from 1 to 50 vol. %, based on the total volume of the coating composition.

15. The method of claim 9, wherein the extender pigment slurry composition (c), when used, is mixed in the mixing container in an amount from 1 to 50 vol. %, based on the total volume of the coating composition.

16. The method of claim 10, wherein the resin slurry composition (d) is mixed in the mixing container in an amount from 1 to 50 vol. %, based on the total volume of the coating composition.

17. The method of claim 9, wherein the pigment slurry composition (b) and/or the extender pigment slurry composition (c) are resin-free.

18. A coating system, comprising as separate components:
(a) a hiding pigment-free basecoat composition from which multiple sheens can be produced, comprising:
   (i) a basecoat resin; and
   (ii) a liquid carrier; and
(b) and/or (c) as follows:
(b) a pigment slurry composition, comprising:
   (iii) a hiding pigment;
   (iv) a rheology modifier; and
   (v) a liquid carrier;
(c) an extender pigment slurry composition, comprising:
   (vi) an extender pigment;
   (vii) a rheology modifier; and
   (viii) a liquid carrier,
wherein the rheology modifier (iv) and/or (vii) comprises an organic rheology modifier and an inorganic rheology modifier,
wherein the components are maintained in separate containers, each of which is in fluid communication with each other and/or a mixing container.

* * * * *